US006936971B2

(12) United States Patent
Chukanov

(10) Patent No.: US 6,936,971 B2
(45) Date of Patent: Aug. 30, 2005

(54) METHODS AND SYSTEMS FOR GENERATING HIGH ENERGY PHOTONS OR QUANTUM ENERGY

(75) Inventor: Kiril B. Chukanov, West Jordan, UT (US)

(73) Assignee: Chukanov Quantum Energy, L.L.C., Sandy, UT (US)

( * ) Notice: Subject to any disclaimer, the term of this patent is extended or adjusted under 35 U.S.C. 154(b) by 418 days.

(21) Appl. No.: 09/990,024

(22) Filed: Nov. 21, 2001

(65) Prior Publication Data

US 2003/0094911 A1 May 22, 2003

(51) Int. Cl.$^7$ .............................................. H05B 31/26
(52) U.S. Cl. .................................. 315/111.91; 315/108
(58) Field of Search ........................ 315/111.91, 111.81, 315/111.41, 500, 507, 248, 108; 250/305, 395, 423 R

(56) References Cited

U.S. PATENT DOCUMENTS

| | | | | | |
|---|---|---|---|---|---|
| 4,019,091 | A | * | 4/1977 | Schoenmakers | 315/111.81 |
| 4,598,231 | A | * | 7/1986 | Matsuda et al. | 315/111.81 |
| 4,654,561 | A | | 3/1987 | Shelton | 315/111.71 |
| 5,018,180 | A | | 5/1991 | Shoulders | 378/119 |
| 5,054,046 | A | | 10/1991 | Shoulders | 378/119 |
| 5,054,047 | A | | 10/1991 | Shoulders | 378/119 |
| 5,123,039 | A | | 6/1992 | Shoulders | 378/119 |
| 5,148,461 | A | | 9/1992 | Shoulders | 378/119 |
| 5,153,901 | A | | 10/1992 | Shoulders | 378/119 |
| 5,175,466 | A | | 12/1992 | Seward, III | 313/231.31 |
| 5,537,009 | A | | 7/1996 | Chukanov | 315/248 |
| 5,541,385 | A | | 7/1996 | Konkola | 219/121.6 |
| 6,088,120 | A | | 7/2000 | Shibusawa et al. | 358/1.15 |
| 6,313,428 | B1 | * | 11/2001 | Chen et al. | 219/121.43 |

OTHER PUBLICATIONS

Aspden, Harold, "Aether Science Papers: Part I: The Creative Vacuum," Aether Science Papers, (1996), pp. 26–32.
Chukanov, Kirl Borissov, "Final Quantum Revelation," General Energy Int'l., Salt Lake City, Utah (1994).

Langmuir, Irving, "Irving Langmuir's Ball Lightning Tube," Scientific American, (1920).

Lowke, J J, "A Theory of Ball Lightning as an Electric Discharge," J. Phys. D: Appl. Phys. vol. 29, pp. 1237–1244, (1996).

Rafiada, Antonio F., Soler, Mario, and Trueba, José L., "Ball Lightning as a Force–Free Magnetic Knot," Physical Review E, vol. 62, No. 5, pp. 7181–7190, (Nov. 2000).

Roth, J. Reece, "Ball Lightning: What Nature is Trying to Tell the Plasma Research Community," Fusion Technology, vol. 27, pp. 255–269, (May 1995).

Sanduloviciu, M. and Lozneanu, E., "Ball Lightning as a Self–Organization Phenomenon," Journal of Geophysical Research, vol. 105, No. D4, (Feb. 27, 2000) pp. 4719–4727.

Tsui, K. H., "Force–free model of ball lightning," Physics of Plasmas, vol. 8, No. 3, (Mar. 2001).

Turner, D. J., "Ball Lightning and Other Meteorlogical Phenomena," Physics Reports 293, University of Bristol, (1998).

* cited by examiner

Primary Examiner—Thuy Vinh Tran
(74) Attorney, Agent, or Firm—Kirton & McConkie; Berne S. Broadbent

(57) ABSTRACT

The invention generates high-energy particles, or quantum energy, from a quantum macro object. The method used comprises: (a) isolating a gaseous substance within a bounded area; (b) energizing the gaseous substance, causing the gaseous substance to transition into a glow discharge plasma state; (c) increasing the gas pressure within the bounded area to transition the glow discharge plasma to a quantum macro object comprising a positively charged nucleus surrounded by an electron cloud; (d) inducing an active impact upon the quantum macro object such that the potential energy existing within the quantum macro object is converted and released in the form of quantum energy in a continuous and inexhaustible manner. The bounded area is typically created by a dielectric of various sorts, such as within a dielectric container or properly charged air.

34 Claims, 14 Drawing Sheets

METHODS AND SYSTEMS FOR GENERATING HIGH ENERGY PHOTONS OR QUANTUM ENERGY

BACKGROUND

1. Field of the Invention

The present invention relates to the generation and/or production of energy, and in particular, to the generation and/or production of high-energy photons or quantum energy derived from the excitement of or active impact upon a quantum macro object produced within a controlled environment.

2. Background of the Invention

The naturally occurring phenomenon known as ball lightning remains one of the greatest mysteries in the field of electromagnetism. Despite enormous contemporary advancements into the micro-universe (i.e. the fundamentals of the structure of atoms, nuclei, elementary particles, structure of the universe, etc.), ball lightning remains largely undiscovered, although there has been significant interest in this phenomenon by numerous researchers and scientists.

The nature and characteristics of ball lightning have remained largely unexplained for several reasons. First, there has not been found an effective way to reliably reproduce at least some of the unique effects of the phenomenon in a controlled and artificial environment. Second, its appearances seem to be random (other than the fact that it appears primarily during or after a thunderstorm), infrequent, and very brief, thus not providing a suitable setting in which to study this phenomenon even as it naturally occurs. In addition, most individuals that have had occasion to observe ball lightning have not had sufficient training in the sciences. As a result, the origin, properties, and nature of ball lightning still remain baffling to experts.

Although largely misunderstood, and although several have experimented with trying to artificially recreate ball lightning in the laboratory, due to the documented instances where ball lightning has been observed and the events that have taken place during these observations, many have come to believe that this relatively small object contains a colossal amount of potential energy. This belief stems mostly from some of the rather impressive and strange events that have resulted from the presence of what was believed to be the elusive phenomenon of ball lightning. Although there is widespread belief that ball lightning comprises significant potential energy, trying to reproduce ball lightning in the lab in order to research and possibly exploit this potential source of energy has proved all but impossible.

In the past, several attempts have been made to reproduce ball lightning. In one instance, ball lightning is believed to have been created by taking a material, such as a gas, at an initial pressure below atmospheric. The gas is treated with RF energy at a frequency greater than 1 MHz to transition the gas to a glow discharge state, and then at increased pressure to a new state, wherein the average internal temperature is the same or an order of magnitude higher than in the glow discharge state, but the rate or radiating heat is at least an order of magnitude lower than in the glow discharge state. Energy only in the form of heat is extracted from the "new" object through contact with a heat conducting member.

This particular method suffers in that it merely provides for the creation of an object in a new state, without more. This new state is believed to be ball lightning, but little is discussed regarding the availability of energy within the "new state" object beyond that of heat. Indeed, the new object is said to have an internal temperature on the order of magnitude higher than the internal temperature of the glow discharge state and that this energy may only be extracted through the use of a heat conducting member. However, other than heat, no energy is realized through the creation of the described object.

SUMMARY AND OBJECTS OF THE INVENTION

Despite the deficiencies found within the prior art, significant advantages would be realized from the generation or production of energy from an object possessing similar properties and characteristics as those believed to be found in ball lightning. This object, referred to as a "quantum macro object" for purposes of this description, is taught herein. Although the object is believed to be "artificial" ball lightning, any later significant advances made on ball lightning that distinguish the described quantum macro object away from ball lightning are not to be considered limiting as it would still be advantageous to be able to generate energy from an object possessing such unique properties and characteristics as those found in the quantum macro object as described and taught herein despite whether it is actually artificially reproduced ball lightning or some other phenomenon.

Therefore, it is an object of the preferred embodiments of the present invention to provide a method for generating a quantum macro object.

It is another object of the preferred embodiments of the present invention to provide a method for generating high-energy photon particles or quantum energy derived and released from the potential energy found in the created quantum macro object.

To achieve the foregoing objects, and in accordance with the invention as embodied and broadly described herein, the present invention features a method and system for generating high-energy photons. These high-energy photons are believed to be quantum energy. The quantum energy generated by the process as taught herein is derived from a quantum macro object, which is believed to possess similar properties and characteristics as those of ball lightning. In particular, the quantum macro object possesses a positively charged nucleus having a definite and distinct boundary, and an electron cloud directly adjacent the boundary that comprises a plurality of quantum electrons in a quantum state, and a plurality of free-floating electrons not associated or connected with the quantum macro object. The quantum electrons within the quantum macro object are believed to possess an enormous amount of potential energy that may be converted and released as quantum energy. The quantum energy is also believed to be a free gift of nature and capable of being utilized in numerous practical applications.

The method of generating high-energy photons, or quantum energy, comprises in general: (a) isolating a gaseous substance within a bounded area, wherein the gaseous substance and the bounded area contain a plurality of composition particles; (b) energizing the gaseous substance, and particularly the particles within the gaseous substance and the bounded area, thus causing the gaseous substance to transition into a glow discharge plasma state, wherein the particles are separated into their component atomic nuclei and electron parts; (c) increasing the gas pressure within the bounded area to transition the glow discharge plasma to a quantum macro object, wherein the quantum macro object comprises a positively charged nucleus and an electron cloud surrounding the positively charged nucleus, the electron cloud comprising a plurality of quantum electrons and a plurality of free-floating electrons, the quantum electrons comprising large amounts of potential energy; (d) energizing the quantum electrons by inducing an active impact upon the quantum macro object, wherein the quantum electrons are caused to orbit the nucleus of the quantum macro object such that the potential energy within the quantum electrons is converted and released in the form of high-energy photons or quantum energy. The bounded area is typically created by a dielectric of various sorts, such as within a dielectric container. Moreover, the potential energy within the quantum electrons is believed to be a free gift of nature as a result of the combination of atomic nuclei to form the positively charged nucleus and the filling of quantum energy levels by the quantum electrons associated with the nucleus of the quantum macro object.

In a preferred embodiment, the present invention features a method and system of generating quantum energy comprising: (a) filling a dielectric container with a gaseous substance, the dielectric container having an identified volume; (b) placing the dielectric container within a radiation chamber; (c) energizing the gaseous substance to transform the gaseous substance into a plasma or glow discharge plasma state; (d) transforming the plasma into a new state to obtain a quantum macro object having a positively charged nucleus with a definite and distinct boundary and an electron cloud adjacent to and surrounding the boundary, the electron cloud containing a plurality of electrons in a quantum state and a plurality of free-floating electrons not associated with the quantum object, the electron cloud contained within a dielectric barrier created between a dielectric wall within the dielectric container and the nucleus of the quantum macro object; and (e) inducing an active impact upon the quantum macro object by energizing the quantum electrons with an electrical current, wherein the quantum electrons are caused to accelerate in an orbital motion around the quantum macro object, thereby radiating high-energy photons in the form of quantum energy.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE PREFERRED EMBODIMENTS

Figure 1:
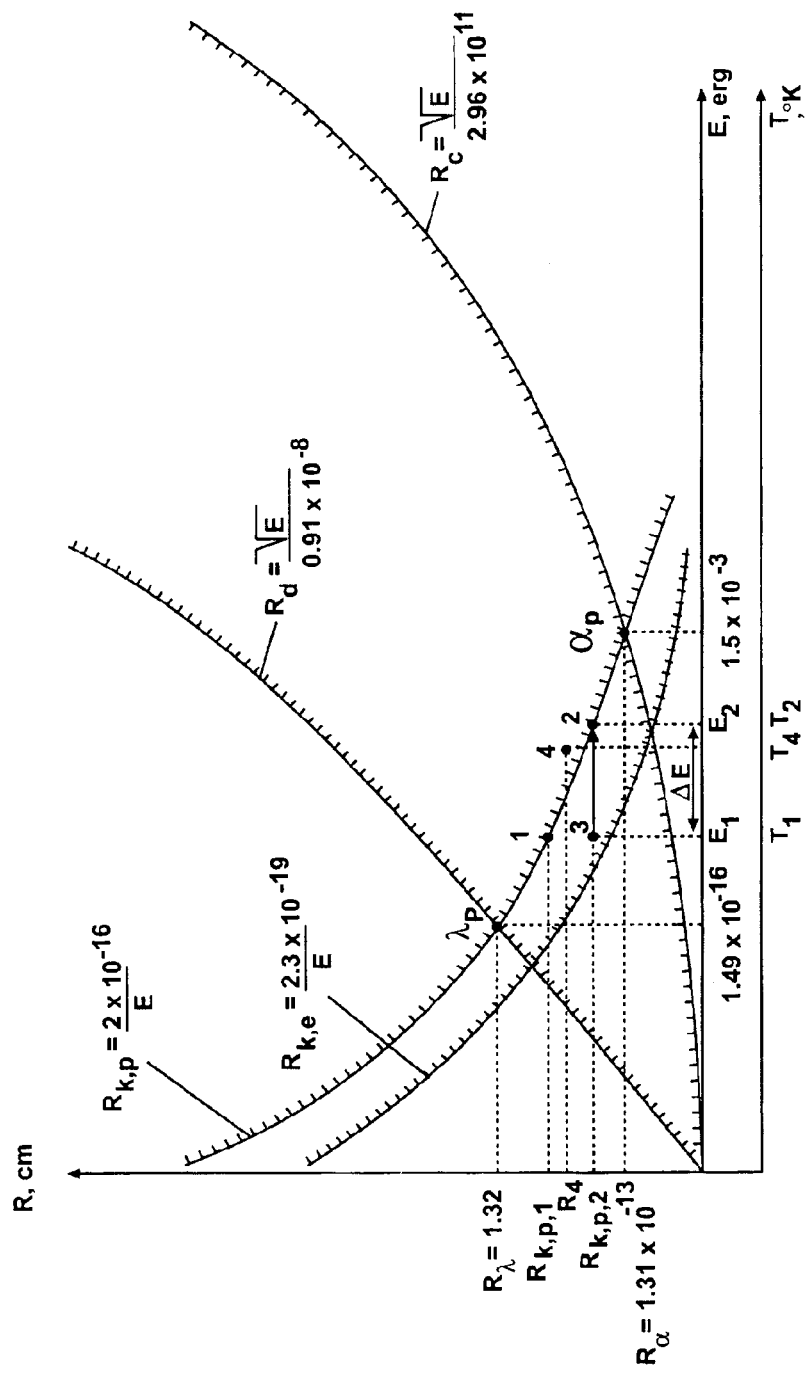
FIG. 1 illustrates a graph showing the boundaries of the ordered world.

It will be readily understood that the components of the present invention, as generally described and illustrated in the figures herein, could be arranged and designed in a wide variety of different configurations. Thus, the following more detailed description of the embodiments of the systems and methods of the present invention, and represented in FIGS. 1 through 14, is not intended to limit the scope of the invention, as claimed, but is merely representative of the presently preferred embodiments of the invention.

As it is believed that the quantum macro object of the present invention, as discussed and explained herein, possesses similar properties and characteristics as the naturally occurring phenomenon known as ball lightning, a brief and general discussion of ball lightning is provided. It should be emphasized, however, that although it is believed that some or all of the properties and characteristics of the quantum macro object of the present invention are similar or identical to those of ball lightning, the inventor makes no claims that the quantum macro object is indeed artificially created ball lightning. The focus of the present invention is the production and generation of high-energy photons or quantum energy as derived and obtained from a quantum macro object. Therefore, whether the quantum macro object is indeed ball lightning, or whether it is some other body, does not affect the scope or substance of the invention as taught and described herein.

General Nature and Characteristics of Ball Lighting

Although several books and papers have been written on the subject, there seems to be a common conception regarding the properties and characteristics of ball lightning. Ball lightning is generally described as a fireball or plasmoid observed as a glowing, self-luminous sphere moving slowly or floating in the atmosphere. It is usually associated with lightning strokes or thunderstorm activity.

Natural ball lightning has been observed to have a diameter that typically ranges anywhere from 1 cm to several meters. Reported observations indicate that ball lightning is a luminous sphere as bright as a strong household fluorescent lamp that has a steady glow or shine. However, some have reported that the ball's luminosity pulsates. In addition, most balls appear to have relatively uniform surface brightness and appear to be optically thick. In general, ball color, size, and luminosity are reported to remain constant throughout the life of the object. The colors reported have ranged across the entire visible spectrum; however, green and violet are rare.

Ball lightning has been known to last from a few seconds to greater than 150 seconds. These relatively long lifetimes are one of the most intriguing features of ball lightning as this may suggest that the ball possesses some inherent energy source independent of external sources. On the other hand, some balls have been reported to fade out quietly, while others disappear abruptly, and occasionally with an explosion or by breaking into small fragments. On the whole, observers report detection of no radiant heat from the balls, even when the ball passes by at close range.

Ball lightning further appears to have neutral buoyancy as it is sometimes seen to descend relatively slowly through the atmosphere before striking the ground. However, it most frequently appears to float, sometimes hovering in one place at a constant distance above the ground for many seconds. Normally, the ball moves horizontally, but sometimes it moves vertically through the air with a speed of one-tenth to several meters per second. Ball lightning has been observed to move against the prevailing wind. Thus, it can be deduced that ball lightning may be acted upon by environmental conditions. However, it has also been reported that ball lightning is attracted to conductors and transformers, as well as moving as a result of the positive charge on the earth's surface during a thunderstorm, thus leading one to believe that ball lightning carries with it a considerable electric charge.

Observers are usually unaware of any sound being emitted by ball lightning, although most observations are made at a significant distance from it. When it terminates, its behavior ranges from simply phasing out of existence with barely an audible popping sound, or no sound at all, to a sudden termination and major explosion that can do more damage than a hand grenade. The final disappearance of a ball is occasionally reported to leave a slight mist or residue. An odor variously described as resembling ozone, or sulfur, or nitrogen dioxide is sometimes associated with ball lightning.

Despite attention by distinguished scientists over a period of 150 years, ball lightning remains one of the greatest mysteries of electrical activity in the atmosphere.

The majority (approximately 80%) of ball lightning appears to be associated with thunderstorm activity and in many cases directly after a lightning flash. In many instances, the first appearance of the ball occurs at or close to the impact point of a cloud-to-ground flash. A substantial number of occurrences are observed inside buildings, submarines, or other enclosed structures, although in some of these cases the actual origin of the ball may be outside such structures. On several occasions, ball lightning has been observed moving down the aisle of a passenger airplane in flight after the plane had been struck by lightning. A surprising occurrence reported by many eyewitnesses is that a moving ball can penetrate through doors, closed windows, chimneys, and other apertures without causing material damage. Phenomena resembling ball lightning are often reported emanating from the funnels of tornadoes, cyclones, waterspouts, and hurricanes. They have also been seen during earthquakes and volcanic activity. In other words, their occurrence is in circumstances where high electric fields would be expected to exist.

Perhaps the most intriguing aspect of this phenomenon is its potential energy. In recent years, ball lightning has attracted attention because many believe it to possess a significant amount of potential energy. What this energy is, or to what degree it exists is unknown because the total energy and energy density of ball lightning are very difficult to estimate accurately. Calculations are based on observations, and particularly various effects or damage resulting from the final disappearance or explosion of ball lightning, followed by estimated or calculated guesses as to the amount of energy required to produce the observed damage. These investigations have shown that ball lightning may have a total energy content ranging from 0.01 J to values greater than 10 MJ. For comparison, the energy content of a hand grenade is approximately 1 MJ. A believed characteristic value for the energy content of ball lightning is approximately 10 to 100 J.

Estimates have been made not only of the energy content of ball lightning but also its energy density. The data fall along a straight line, indicating a lognormal distribution, with a median energy of approximately 5 $J/cm^3$ and extreme values ranging from less than $10^{-3}$ $J/cm^3$ to values higher than $10^5$ $J/cm^3$. The very high value of the energy density at the upper end of the distribution is significant. For example, the energy density of TNT, which has one of the highest energy contents of any solid explosive, is ~2000 $J/cm^3$, far below the maximum observed for ball lightning.

Ball lightning is observed to maintain an approximately constant diameter during its entire lifetime, thus suggesting a balance between the external atmospheric pressure and the net kinetic pressure of the plasma/magnetic field configuration inside the ball lightning. Because the external pressure on ball lightning is 1 atm, this places an upper bound on the net kinetic pressure inside the ball lightning of no more than $10^5$ $N/m^2$.

The observations of ball lightning suggest a plasma-related phenomenon with significant magnetic energy potential.

Much uncertainty surrounding the existence of ball lightning, as well as the infrequent appearances of ball lightning, has resulted in the failure of scientists and/or physicists to perform any in depth analysis, or to devote any serious attention to the study of ball lightning. Moreover, although many have tried, it is believed that no one has yet been able to successfully artificially reproduce ball lightning in the laboratory.

Several reasons exist for the lack of attention. First, many believe the phenomenon to be insignificant to the point that no one expects to realize any great benefit for humankind from understanding the nature of ball lightning. Many believe that the energy of ball lightning is negligible and comes form an external source, even though some recent studies have suggested that perhaps ball lightning does indeed contain significant energy potential. Second, to reproduce a natural phenomenon under controlled conditions first requires a clear understanding of what, exactly, the natural phenomenon is. So far, modern scientists are not clear about the nature of ball lightning. As explained, up to this point, observations, not experimentation, have been the only source of information. Further, this information is based simply on the statistical analyses of the reported sightings of ball lightning by members of the general public.

Despite all of this, it is believed that ball lightning does possess significant potential energy. In addition, it is believed that the quantum macro object of the present invention possesses similar energy potential, whether the quantum macro object is ball lightning or not. Thus, what follows is a proposed model of the quantum macro object, including its properties and characteristics as they make possible the generation of high-energy photons or quantum energy.

Proposed Hypothesis or Model of the Quantum Macro Object

As will be explained in greater detail below, the quantum energy generated or produced by the method and system of the present invention is dependent upon the creation of a quantum macro object.

To understand the significance of the quantum macro object of the present invention along with its unique properties and characteristics, it is first necessary to propose and discuss the inventor's understanding of the boundaries of the ordered world as they currently exist, and the quantum realm that exists outside these boundaries. Referring to FIG. 1, shown are several identified boundaries on a graph, where the vertical axis is the spatial distance R, in cm, between particles such as atoms, or ions, or atomic nuclei, or protons; and the horizontal axis E is the energy of a particle in Erg. The inventor believes that the ordered world and its matter such as atoms, which have their normal complement of electrons, conform to the currently accepted principles of physics when in the R-E space, which is to the right of curve $R_d$, to the left of curve $R_c$, and above the curve $R_{k,p}$. It is within these boundaries that the substances and materials that exist to make up the ordered world and the known universe are determined and predictable. These substances are material objects existing in three-dimensional space. Specifically, within the area limited by the quantum boundaries $R_{k,p}$, $R_d$, and $R_c$, all of the known laws of physics, including the law of gravity and law of conservation of energy, are strictly observed.

On the other hand, outside of this area, or these boundaries, such as below the boundary $R_{k,p}$, the physical face of the world changes drastically as a result of being outside the boundaries of the ordered world and within what may be termed the quantum realm. In the quantum realm, the known laws of physics are altered and unpredictable. Moreover, material objects become two-dimensional quantum objects where it is believed that many of the laws of physics do not apply and are even violated, such as with the principle of conservation of energy. For example, if gas (e.g. air) is forced to ionize very quickly ($10^{-6}$ to $10^{-9}$ seconds) and completely enough so that the energy absorbed by the atomic nucleus is low, the complex ionized atomic nuclei that result could lay outside the determined area of existence of the substance. This is explained in greater detail below.

The inventor believes that if the electrons are stripped away from their associated atoms to leave only the atomic nuclei, e.g., only protons, in matter which starts out at a point in R-E space such as point 3 in FIG. 1, the matter will spontaneously move to the right in FIG. 1, from point 3 to the boundary $R_{k,p}$ e.g. at point 2, and to accomplish this move will gain energy, which comes from a source that does not conform to currently accepted principles of physics. The inventor believes that the method of generating quantum energy, along with the system used to generate such energy, as will be explained below, is dependent upon first, the process of placing nuclei stripped of their electrons at a point in R-E space such as point 3 in FIG. 1 and extracting therefrom the energy spontaneously generated as a result of the material's move toward the $R_{k,p}$ boundary, e.g., to point 2, and second, creating an outside active impact upon the quantum macro object to cause the electrons to radiate quantum energy.

The inventor also believes that gas, as it exists within the ordered world, is at a point in R-E space, such as point 4, at which the atoms or molecules of the gas have their electrons and their behavior conform to the accepted principles of physics. As commonly known, the atoms and/or molecules of the gas may be caused to ionize, in which some of the atomic nuclei are left free of electrons, but these electrons are initially above the $R_{k,e}$ boundary because the spatial distance R between them is too great. As will be explained below, the inventor believes that the spatial distance between the electron-free ions may be caused to be decreased, such that the electron-free nuclei find themselves below the boundary $R_{k,p}$, during which time they spontaneously move to that boundary and in the process generate energy (shown in FIG. 1 as ΔE). Although this energy is impressive, it is only a start. The quantum macro object, through this process, coupled with the creation of an active impact upon the quantum macro object, will provide for the awesome generation of quantum energy.

The quantum macro object of the present invention may be created from the surrounding air if certain conditions are met that allow existing electrons to fill quantum energy levels, $E_n$, where n represents the quantum number of a particular electron. Preferably however, the creation of the quantum object is facilitated through the use of a plasma generated from a gaseous substance exposed to high frequency radiation. The high frequency field and high temperature facilitate the release of electrons with an initial velocity and energy of $V_1$ and $E_1$ respectively. Importantly, as conditions are met causing the various atomic nuclei to form into a macro positively charged nucleus, the associated electrons, because of Pauli's exclusion principle, are forced to jump to the highest quantum energy levels, thereby becoming "quantum electrons." In other words, these electrons suddenly receive additional energy, or potential energy, that is not derived from their immediate environment, but is a free gift of nature. This additional potential energy may be released or converted to quantum energy when these electrons are acted upon by some external source. Thus, the practical applications of being able to contain and channel this energy are immediately apparent.

It is not possible to isolate a volume in ordinary plasma. Plasma particles (electrons and atomic nuclei) cannot be captured by a holding force. They diffuse unobstructed into the surrounding atmosphere. The quantum macro object of the present invention is a structureless nuclear component that forms a metastable homogenous compact body with well-defined section boundaries. The structureless nuclear component cannot mix with the atoms of the atmosphere, which are separate and distinguished as individuals, even though the quantum macro object plasma can be penetrated by atmospheric atoms. The quantum macro object is an autonomous body.

The quantum macro object is a stable body. This stability results from the nuclear forces underlying its "destructive"

strength, as well as the balance between the creative (nuclear) forces of attraction and the destructive forces of repulsion (electromagnetic forces). The radius of activity of the forces of attraction is only $R<R_{k,p}$ while the forces of repulsion are unlimited, meaning, of course, unlimited when there is no "screen" created by particles with opposite charges. If the quantum macro object releases its negative charge, or only part of it, then it will be destroyed under the electromagnetic forces of repulsion. If, for example, one electron is isolated from each atom of 1 cm³ air, and if the isolated electrons are placed at a distance equal to 1 cm., an enormous force of attraction between electrons and positive ions will be created. The pressure resulting from the repulsion force between the same electrical charges within the charged volume will also be enormous. Thus, it is absolutely impossible to have considerable division between electric charges in ordinary plasma. However, this same situation becomes a possibility with the quantum macro object.

The quantum macro object is a material continuum with no discrete particles. The substance of the quantum macro object (atoms, molecules, clusters) is not neutral. Moreover, the quantum macro object is a very good conductor of electricity. Its contact with charged conductors initiates very powerful emissions instantaneously. In short, the quantum macro object is a superconductor. If a current from an external source is induced from the exterior, it will circulate within the quantum macro object endlessly unless there is a leak.

The most mysterious aspect of natural ball lightning is the source of its energy. Readers who are interested in the problem are acquainted with numerous hypotheses attempting to explain the source of its proposed colossal energy. None, however, can explain all of the peculiarities in ball lightning's behavior. Some hypotheses suggest that the energy comes from within the sphere of ball lightning-that it is somehow stored in the form of chemical or physical energy. However, evaluating the maximum value of the potential energy shows that it is no higher than the energy necessary for the complete ionization of the atoms, which is much lower than the destructive energy unleashed by ball lightning that witnesses have observed. A second set of hypotheses suggests that the energy source exists outside of the sphere of ball lightning and reaches the sphere by an electric guide or a wave-guide. This hypothesis is also unsatisfactory. To compensate for the losses received within the volume occupied by the ball lightning requires that the wave-guide or current channel possess enormous energy-about 100 Wt/cm².

Like ball lightning, the quantum macro object of the present invention also is believed to possess enormous energy potential. The quantum macro object, because of the quick and complete ionization of its atoms, appears to be below the bottom quantum boundary $R_{k,p}$ (point 3 in FIG. 1). In this state, it is "hidden," undetermined. It has no contact with the surrounding, determined world and remains unnoticed. To escape its isolation and at the same time to preserve the density of its substance ($R=R_3$) unchanged, the quantum macro object appears on the bottom boundary kp at point 2. But its very appearance in the determined world is accompanied by an additional energy $\Delta E$, which is not taken from the ordered world but which is sort of a quantum gift of nature. Within the limits of $\Delta R = R_{k,p,1} - R_{k,p,3}$, this seeming violation of the law of energy preservation is permitted.

The idea of a violation of the law of energy preservation is not new but this violation concerns only the restriction: $\Delta E \times \Delta t \geq h$. It is believed that within the span of $\Delta t$ quantum time, so-called virtual particles could be initiated, a process which, in itself, violates the law of energy preservation. However, in the course of this quantum time span, all energies are restored. The quantum moment ends with no losses or extra energy.

Although the quantum nuclear component has no definite internal structure as its individual atomic nuclei are melded together and undistinguishable, the electron component of the plasma, however, after quick ionization, is transformed into regular electron plasma comprising a plurality of individual free electrons. The structureless nuclear component of the quantum macro object is not only superfluid in quality but also has properties of heat superconductivity. The quantum macro object is one body (a macro atom) and the electrons are in a single electron cloud characterized by the collective motions of the electrons and the satisfaction of Pauli's exclusion principle. The electrons in the electron cloud cannot be in an equal quantum state. What distinguishes the separate electrons in the electron cloud is their different energies. All energy levels around the Fermi surface are occupied by electrons.

Another unique characteristic of the quantum macro object is its nucleus. It is believed by the inventor that the nucleus is a two-dimensional object because a quantum material object can only be in a "closed two-dimensional formation." The proton (nucleon) component of the quantum macro object is "open to the outside." It has a sharp line of demarcation separating this two-dimensional object from the surrounding environment.

During some experiments, the quantum macro object was touched with a metal stick. In this experiment, the metal stick could not penetrate into the nucleus because the nucleus possessed no volume. Instead, the nucleus was deformed by the metal stick. Thus, the quantum macro object behaved like a solid. During these experiments, the dimensions of the surface of the nucleus did not change either. The quantum macro object nucleus is "closed to the inside," therefore, no macro-material formation can penetrate through the quantum surface.

When observing the quantum macro object experimentally, the macro nucleus and the electron cloud are perfectly visible and distinguished from one another. In several of these experiments (using a quartz dielectric container and air as the gaseous substance), the color of the electron cloud was orange. The nucleus was observed as having a sharp spherical boundary between the orange-colored electron cloud and the volume of gas closed by this quantum boundary. Using various levels of input power, the quantum macro object may become transparent. In this state, the quantum macro object radiates a lot of heat, but no shining plasma formations are visible in its volume. This experiment provides a very good visual illustration of the two-dimensional structure of the nucleus of the quantum macro object.

The nucleus of the quantum macro object is also impermeable to electrical current. In one experiment, a rather weak high voltage current (in some experiments: U=15,000 volts, I=0.01 amps) was used to create an arc discharge between two electrodes. Instead of penetrating the nucleus and taking the shortest route between two points (the electrodes), the electrical current traveled around the nucleus of the quantum macro object, thus sort of "sliding" along the surface of the nucleus.

Several experiments have led the inventor to formulate many beliefs about the quantum macro object. First, the quantum macro object is a giant macro atom composed of a two-dimensional quantum nucleonic nucleus and a three-dimensional electronic shelf. Second, the quantum macro object is an unusual material object behaving much like a material point in space. On the quantum surface of this two-dimensional material body, there are no differentiated points or areas. Third, the nucleus of the quantum macro object is a closed two-dimensional material formation, which can be deformed without changing the volume of the surface. Fourth, it is not possible to create the quantum macro object between two closed surfaces (like ordinary plasma). Fifth, the surface of the nucleus of the quantum macro object is much like a mirror in which every particle can see its counterpart.

The quantum macro object as a source of energy has overwhelming advantages. It is believed that it will produce quantities of very cheap energy, may be used to construct very powerful electron accelerators, require no burning of fossil fuels, create no waste products, create no environmental hazards, be safe to use, and be technically simple to manufacture, maintain, and adapt to commercial and household use.

Method and Apparatus for Generating a Quantum Macro Object and Quantum Energy Therefrom The presently preferred embodiments of the invention will be best understood by reference to the drawings wherein like parts are designated by like numerals throughout.

The present invention comprises methods and systems for generating quantum energy from a quantum macro object. Primarily, the methods of generating this quantum energy will be discussed in detail below, with the actual physical devices and systems used to carry out the steps of the present invention discussed to a lesser extent.

Simply stated, the method of generating quantum energy according to the present invention is dependent upon two major steps, the first being the creation of a quantum macro object, wherein the quantum macro object possesses certain characteristics and properties capable of being acted upon to produce quantum energy; and the second being the creation of an active impact upon the quantum macro object to facilitate the conversion of the potential energy within the quantum macro object into useable kinetic energy in the form of high-energy photon particles or quantum energy.

Figure 2:
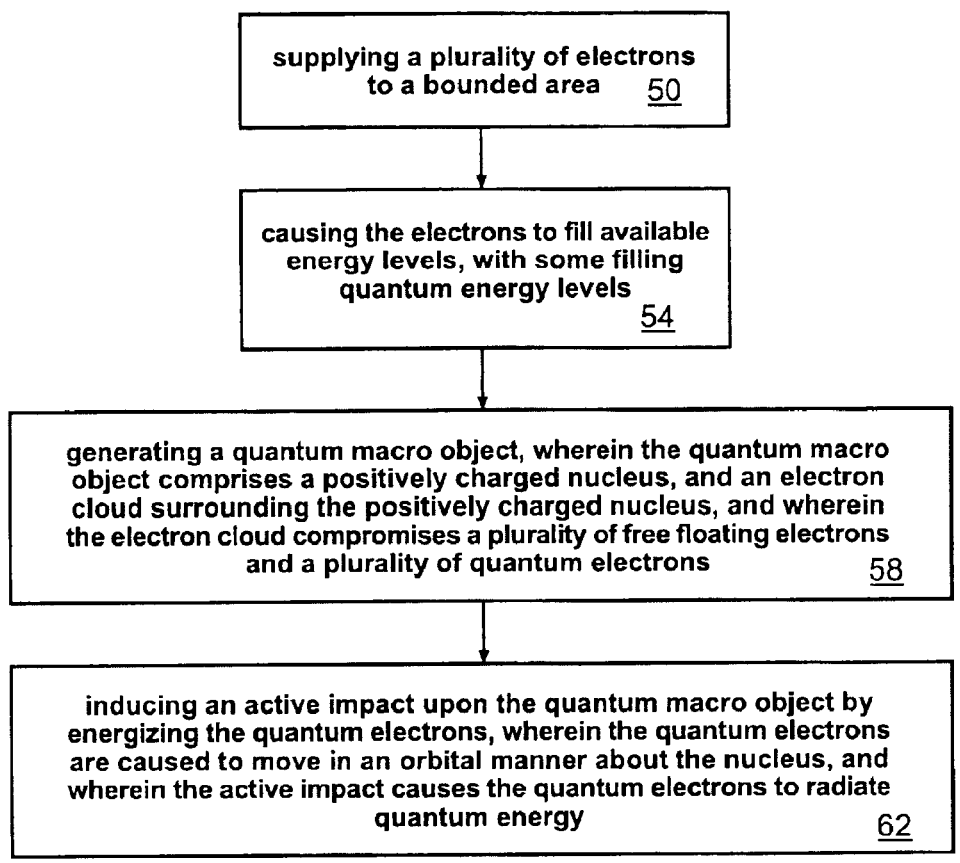
FIG. 2 illustrates a flow diagram of the general process of generating quantum energy according to a presently preferred embodiment of the present invention.

FIG. 2 is a flow chart showing the general steps required to generate quantum energy using any embodiment. Specifically, FIG. 2 shows step 50, that of supplying a plurality of electrons to a bounded area. This may be accomplished by using a closed dielectric container and supplying a gaseous substance within the dielectric container; by using an open dielectric container in conjunction with an electron gun or supply that generates electrons when properly radiated, such as with high frequency microwave radiation; or without a container altogether, wherein the electrons are obtained from the surrounding air. Step 54, that of causing the electrons to fill available energy levels, with some filling quantum energy levels, may be accomplished by creating a plasma within an evacuated dielectric container to break down atoms into their electron and atomic nuclei components; or by filling an open container with a large number of electrons with an electron gun; or by supplying a very large amount of input power into a system containing air in a bounded area. Step 58, that of generating a quantum macro object, wherein the quantum macro object comprises a positively charged nucleus and an electron cloud surrounding the nucleus, and wherein the electron cloud comprises a plurality of free-floating and quantum electrons, may be accomplished in several ways. One way is to increase the gas pressure within a plasma filled dielectric container; another way is to continuously supply a large number of electrons into a bounded area until the quantum macro object appears. Finally, step 62, that of inducing an active impact upon the quantum macro object by energizing the quantum electrons, wherein the quantum electrons are caused to move in an orbital manner about the nucleus, thereby giving off or radiating quantum energy, is also accomplished several ways. Some of these include subjecting the quantum object to an electromagnetic field where a current is induced within the quantum macro object; another way is to use two electrodes to create an induced current within the quantum macro object. As can be seen, the quantum electrons are energized from an outside current. It is this current that causes the quantum electrons to orbit and radiate quantum energy.

Figure 3:
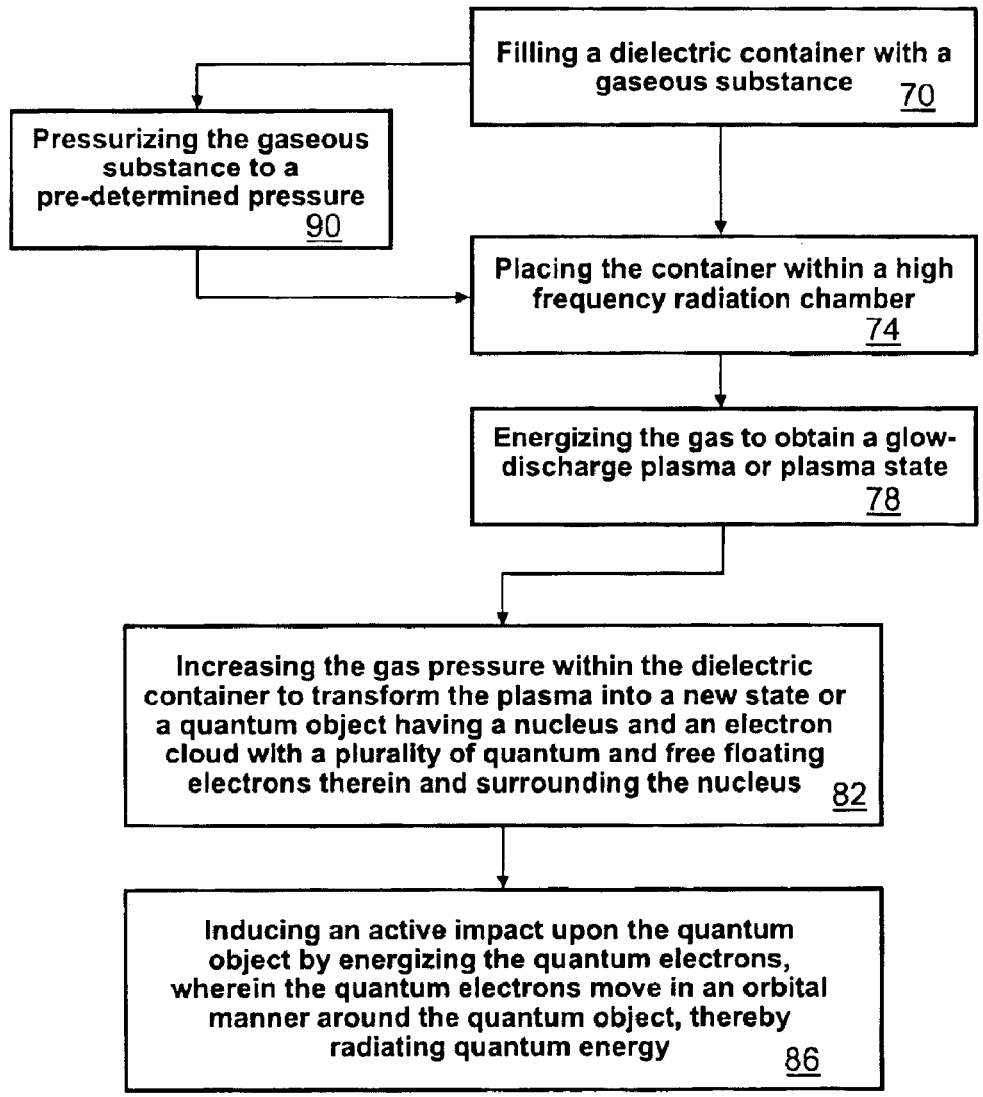
FIG. 3 illustrates a more specific and detailed flow diagram of a presently preferred process of generating quantum energy from a quantum macro object, according to the present invention.

FIG. 3 is a flow chart showing generally the steps of the presently preferred embodiments of the present invention employed to generate quantum energy. The steps in FIG. 3 are merely intended to give a broad overview of the process undertaken, with the details of the equipment and device(s) used, the characteristics of each phase or step, and the details going into each step being described in greater detail below. Referring to FIG. 3, shown is first step 70, that of filling a dielectric container with a gaseous substance. The next step, step 74, is to place the dielectric container within a high frequency radiation chamber that may be insulated and/or sealable to the outside environment. Once the gas filled dielectric container is placed within the radiation chamber, the dielectric container may be evacuated, or partially evacuated. The next step, step 78, involves energizing the gas to obtain a glow-discharge state. This glow discharge-state is simply a plasma state obtained by ionizing the gaseous substance contained within the dielectric container to break down the atoms within the gaseous substance into their atomic nuclei and electron components.

Following the energizing of the gaseous substance, the next step, step 82, involves increasing the gas pressure within the dielectric container to transform the plasma into a new state, which state is the formation or transformation of the plasma into a quantum macro object. The created quantum macro object is believed to be a two-dimensional object and comprises a nucleus with a definite and distinct boundary, and an electron cloud or shelf that is directly adjacent to and surrounds the nucleus. The electron cloud or shelf further comprises a plurality of quantum electrons and a plurality of free-floating electrons therein. The free-floating electrons, although existing within the electron cloud, are not connected or associated with the quantum macro object. These free-floating electrons are kept within the electron cloud because of the dielectric barrier produced between the positively charged nucleus and the dielectric wall of the container. This is discussed further below.

On the other hand, the quantum electrons are connected with the quantum macro object much the same way the electrons in a micro atom are bound to the nucleus of the atom. As a result of their being disassociated from their atomic nuclei during the formation stages of the quantum object, the quantum electrons may not leave the electron cloud because they are drawn to the positively charged nucleus due to their negative charge. As stated, these quantum electrons possess extremely high-energy levels. In fact, the energy levels assumed by these quantum electrons are within the quantum realm (below the boundary Rk,p as shown in FIG. 1). The extremely high-energy potential in the quantum electrons results from their obeying Pauli's exclusion principle. Specifically, the quantity of electrons within the electron cloud determines the energy level of the electrons because each electron is organized into energy levels.

Finally, once the quantum macro object is obtained or generated, the next step, step 86, involves inducing an active impact upon the quantum macro object by energizing the quantum electrons in the electron cloud, wherein these quantum electrons are caused to move in an orbital manner around the quantum macro object. As the quantum electrons orbit the quantum macro object, they produce or radiate quantum energy.

FIG. 3 also shows optional step 90, which involves initially pressurizing the dielectric container and gaseous substance to supply and place a greater amount of gaseous substance within the dielectric container. Pressurizing the dielectric container so more of the gaseous substance may be used results in a more dense gaseous substance where a greater number of atomic particles are present within the dielectric container. This contributes to both the size of the quantum energy generator needed and strength and/or density of the radiated quantum energy particles.

As FIGS. 2 and 3 have been provided to lay out the general and preferred process or method steps of the present invention, respectively, the following figures, particularly FIGS. 4–14, are presented to illustrate these several steps, along with some of the physical devices and systems used to carry out these steps, in order to create a better understanding of the present invention. It should be noted that FIGS. 4–11 are merely representative of one embodiment, a preferred embodiment, of the present invention. Therefore, the processes explained and the systems, devices, and/or equipment used to carry out the specific process steps, should not be taken to limit the invention in any way. Other embodiments, showing various processes and systems, are also presented herein, but these are also not meant to limit the invention in any way as it may be possible, as one of ordinary skill in the art will recognize, to achieve the results of generating high photon particles or quantum energy, or causing electrons in a highly excited state to emit or radiate energy, by using other techniques or methods not discussed herein, but that are still within the spirit of or related to the present invention as taught and explained herein.

Step One—Supplying a Gaseous Substance

Figure 4:
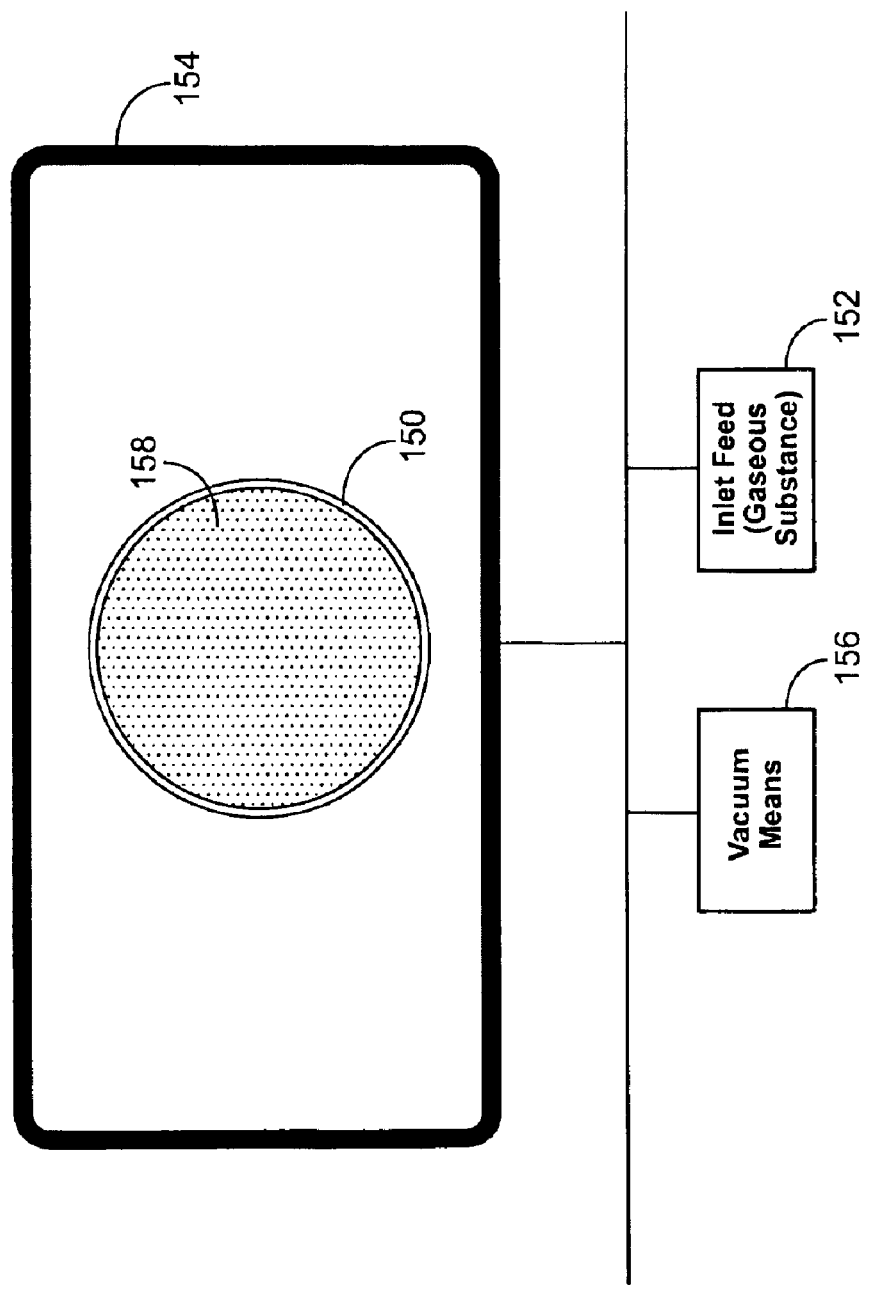
FIG. 4 illustrates an initial step in one method of generating quantum energy, specifically, filling a quartz dielectric container with a gaseous substance.

FIG. 4 is illustrative of the first step in the process of generating quantum energy. Specifically, FIG. 4 shows gaseous substance 158 as it is contained within dielectric container 150. Dielectric container 150 is filled with gaseous substance 158 by directing a line from inlet feed 152 directly into dielectric container 150. Although not shown, it is apparent that inlet feed 152 is coupled to some type of a storage medium that comprises an adequate storage of gaseous substance 158 for later use. While explained in greater detail below, this storage medium may contain one or several different types of gaseous substances and is capable of continuously providing gaseous substance 158 to dielectric container 150 through inlet feed 152 in a normal or pressurized state.

FIG. 4 also shows radiating chamber 154 used to house dielectric container 150 and to facilitate radiating gaseous substance 158 in order to complete ionization of gaseous substance 158 during the process of generating quantum energy. Radiating chamber 154 is preferably a high frequency radiation chamber, such as a microwave chamber, that is capable of containing and supplying high frequency radiation within a defined and bounded area in a continuous manner as needed. Radiation chamber 154 provides an environment wherein dielectric container 150, and particularly the gaseous substance 158 within dielectric container 150, maybe radiated with high frequency radiation. Radiating chamber 154 should be of sufficient size and of suitable shape so as to be able to house dielectric container 150 and the equipment needed to carry out the method of generating the quantum macro object and resulting quantum energy, and to absorb fully the input microwave radiation. As stated, radiating chamber 154 is preferably a high frequency radiation chamber. It is desirable that radiation chamber 154 also be a resonating chamber, thus providing complete containment of the high frequency radiation. Although it may be possible to use several different types of radiation to ionize the gaseous substance, such as, for example, R-F energy, microwaves, radiation from lasers, or electromagnetic fields, the discussion and method described and taught herein focuses on the use of microwaves generated or radiated at a frequency between about 10 MHz and 100 GHz.

One of the recognized advantages of the present invention lies in the material makeup of dielectric container 150. While the use of dielectric container 150 is not entirely necessary to the generation of the quantum macro object or the production of quantum energy, in this preferred embodiment, dielectric container 150 is desirable. Stated simply, the level of power input into the system that is used to generate the quantum macro object and ultimately quantum energy governs whether dielectric container 150 is necessary. These parameters are discussed in greater detail below in reference to one of the alternative embodiments of the present invention, wherein quantum energy may be created without the use of a dielectric container.

In the event a container is employed, the container should be comprised of a dielectric container 150. Dielectric container 150 is necessary as it is intended to work in conjunction with the bounded nucleus of the created quantum macro object to provide a double electron barrier, or dielectric barrier, whose purpose is to contain the free-floating electrons and to keep them within a bounded region, namely the electron cloud of the quantum object. Otherwise, they would be free to move into the surrounding environment. As mentioned above, the quantum electrons are naturally constrained within the electron cloud due to their physical properties and relationship to the positively charged nucleus of the quantum object.

One side of this double electron barrier is formed within the wall of dielectric container 150, with the other side being formed by the anti-electron boundary of the positively charged nucleus of the quantum macro object. Essentially, the double electron barrier provides a shield for the free-floating electrons so they do not crash through the wall of dielectric container 150, but instead rebound, thus being able to continue to sustain the vitality of the quantum macro object. It is important to note that these free-floating electrons rebound from the dielectric barrier without substantial energy loss.

A dielectric is a type of insulator or resistor that governs the permittivity of electric particles, such as electrons. Stated differently, a dielectric material is a substance that is a poor conductor of electricity, but an efficient supporter of both weak and intense electrostatic fields. If the flow of current between opposite electric charge poles is kept to a minimum while the electrostatic lines of flux are not impeded or interrupted, an electrostatic field can store energy. In practice, most dielectric materials are solid. Examples of good dielectric materials include porcelain, ceramic, mica, glass, quartz, plastics, and the oxides of various metals. Some liquids and gases can also serve as good dielectric materials. Dry air is an excellent dielectric. Distilled water is a fair dielectric. A vacuum is an exceptionally efficient dielectric.

An important property of a dielectric is its ability to support an electrostatic field while dissipating minimal energy in the form of heat. The lower the dielectric loss (the proportion of energy lost as heat), the more effective the dielectric material. Another consideration is the dielectric constant, the extent to which a substance concentrates the electrostatic lines of flux. Substances with a low dielectric constant include a perfect vacuum, dry air, and most pure, dry gases such as helium and nitrogen. Materials with moderate dielectric constants include ceramics, distilled water, paper, mica, polyethylene, and glass. Metal oxides, in general, have high dielectric constants.

Although useful in other areas, high-dielectric-constant substances, such as aluminum oxide, are generally not able to withstand intense electrostatic fields like their low-dielectric-constant counterparts, such as air. Thus, if the voltage across a dielectric material becomes too great that is, if the electrostatic field becomes too intense—the material will suddenly begin to conduct current. This phenomenon is called dielectric breakdown. In components that use gases or liquids as the dielectric medium, this condition reverses itself if the voltage decreases below the critical point. But in components containing solid dielectrics, dielectric breakdown usually results in permanent damage.

In keeping with the focus of the present invention, the inventor has discovered that low-dielectric-constant substances are advantageous because of their ability to withstand and maintain high or intense electrostatic fields. As such, dielectric container 150 is preferably comprised primarily of quartz, ceramics, or porcelains, as these provide the necessary electron layer (or dielectric) within the wall of dielectric container 150, thus allowing the wall of dielectric container 150 to serve as one side of the double electron barrier needed to contain the energized electrons (or other particles). In the event the present invention is performed without the use of dielectric container 150, other mediums, for example dry air, which is an excellent dielectric, may serve to create the necessary conditions for generating the quantum macro object of the present invention. Another advantage of the dielectric of the present invention is its ability to allow high frequency radiation to penetrate the dielectric wall of the container, while functioning to keep the free-floating electrons in, thus allowing the gaseous substance contained therein to be exposed and bombarded by the high frequency radiation.

FIG. 4 further shows gaseous substance 158 contained within dielectric container 150. Gaseous substance 158 is typically a low atomic number gaseous substance because of the electron composition within these gasses and the ability of these gasses to quickly ionize into a plasma. The most common types of gaseous substances used to create the quantum macro object are air, oxygen, nitrogen, helium, argon, hydrogen, with air being the preferred gaseous substance in this particular embodiment.

Gaseous substance 158 is allowed to fill the volume of dielectric container 150, thereby providing sufficient particles and matter used to generate the quantum macro object and carry out the generation of quantum energy. Gaseous substance 158 is fed into dielectric container 150 through inlet feed 152 either under normal atmospheric pressure, or under some pressurized state where the gaseous substance is more dense. The effect of filling dielectric container 150 with a gaseous substance under pressure, such that its composition is of a greater density than it would be at normal atmospheric pressure, is that there is a greater amount of particles present within the gas. The greater the density of the gas, the greater the energy potential of the quantum electrons as they are required to fill even higher energy levels, thus increasing in their potential energy. In turn, this directly bears upon the level and intensity of the quantum energy radiated from the quantum macro object. In addition, the type of radiation given off by the quantum macro object is directly related to the density of the quantum macro object. Therefore, if the gaseous substance is much more dense due to the pressure under which it is introduced into the dielectric container, then it follows that the plasma formed from the ionization of the gaseous substance will contain or comprise a greater number of particles in the form of atomic nuclei, electrons and ions. As such, the quantum macro object created or generated from the plasma will likewise exhibit and possess, or be comprised of, a much more dense makeup, which in turn, directly relates to the intensity of the photons or quantum energy radiated from the quantum electrons of the quantum macro object following an active impact thereon. In other words, the intensity and type of quantum energy produced is dependent upon the number of quantum electrons within the quantum macro object. This concept of initially providing a pressurized gaseous substance to dielectric container 150 is discussed further below.

Step 2—Evacuating the Dielectric Container

Finally, FIG. 4 shows vacuum means 156. Vacuum means 156 is used to evacuate dielectric container 154, either completely or partially prior to filling dielectric container 150 with gaseous substance 158. Evacuating dielectric container 154 prior to introducing gaseous substance 158 therein serves to provide a more conducive atmosphere for ionizing the particles within dielectric container 150 and gaseous substance 158 into a plasma or a plasma state. Following its evacuation, and during radiation of radiation chamber 154, dielectric container 150 is allowed to fill with gaseous substance 158 according to the principles and procedures discussed above. As explained above, dielectric container 150 maybe filled with gaseous substance 158 at any pressure. Vacuum means 158 may be any known device or system existing in the art, such as one or more rotary vacuum pumps.

It should be noted that evacuating dielectric container 150 is not necessary for the creation of a quantum macro object. As will be explained below, a quantum macro object may be created despite evacuating dielectric container 150. In the event dielectric container 150 is not evacuated, certain environmental conditions must be met and obtained within radiating chamber 154 in order to facilitate the creation of the quantum macro object. For example, the use of a gaseous substance under pressure, where no evacuation of the dielectric container is undertaken, is possible only if $Power_{input, HF\ radiation}$ into the system (i.e. microwave power) is large enough to generate the number of electrons needed to occupy quantum energy levels. This has been achieved at a level where $Power_{input, HF\ radiation}$ is greater than 15 kW. Stated simply, if $Power_{input}$ is small, then evacuation of dielectric container 150 and the creation of a plasma is preferred due to the ability of a plasma to facilitate the generation of a quantum macro object. On the other hand, if $Power_{input}$ is large enough, no vacuum is needed and no plasma is required to generate the quantum macro object.

Step 3—Energizing the Gaseous Substance to Create a Plasma

As noted above, the quantum object of the present invention may be created without first generating a plasma or glow discharge plasma state and without evacuating the dielectric container 150. However, since the creation of a plasma facilitates the generation of the quantum object, it is preferred that a plasma be used.

Figure 5:
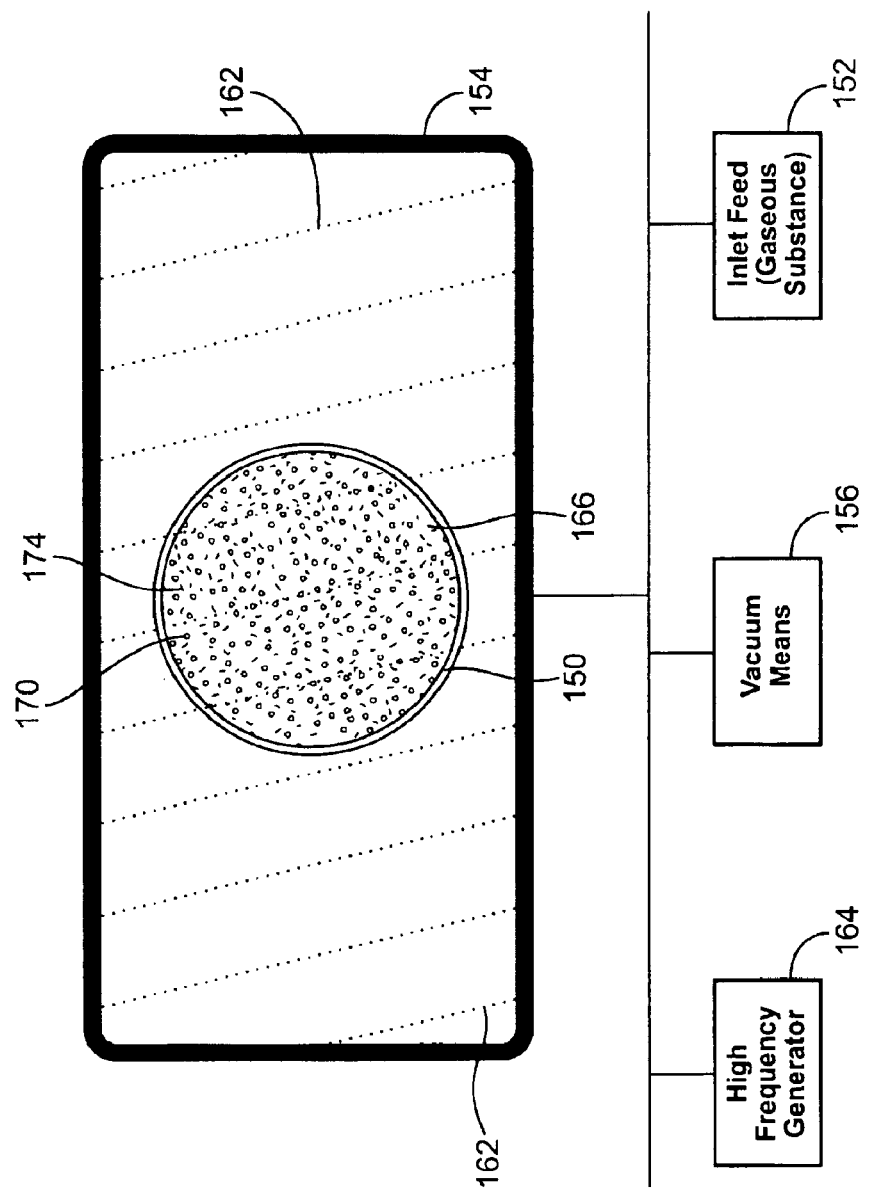
FIG. 5 illustrates another step in one method of generating quantum energy, specifically, transforming the gaseous substance into a glow-discharge plasma state.

Referring now to FIG. 5, shown is the transition of the gaseous substance 158 of FIG. 4 to a plasma state. Using vacuum means 156, once the volume within dielectric container 150 is evacuated, high frequency supply 164 is activated to introduce high frequency radiation 162 within radiation chamber 154. High frequency 162 radiation ranges from about 1 MHz to about 100 GHz in frequency, and is preferably in the form of microwave radiation ranging from about 1 GHz to about 5 GHz in frequency. However, one ordinarily skilled in the art will recognize the several types of energizing radiation, other than RF energy, that can be used to generate or transform gaseous substance 158 into a plasma. For example, high-voltage discharges and/or high-energy particle beams, may be used to attain the ionizing effects required to create a plasma.

In the preferred embodiment, as radiation chamber 154 is filled or bombarded with high frequency microwave radiation 162, gaseous substance 158 is allowed to fill dielectric container 150, which causes gaseous substance 158 to be exposed to high frequency radiation 162. The particles within the gaseous substance must be energized. In order to properly energize the particles, high frequency generator 164 must be able to concentrate enough energy per unit volume in the desired region to ionize a sufficient number of atoms to electron-free nuclei (protons) and maintain that state for a sufficient period of time. Such exposure causes gaseous substance 158 to transition or transform to a normal plasma or glow discharge plasma state 166, with its component atomic nuclei 170 and electron 174 particles.

Transforming a gas into a plasma is well known in the art, and one ordinarily skilled in the art will recognize the various ways this specific process may be carried out. However, a brief description of a plasma is thought to be necessary as its component parts play a major role in the composition and makeup of the quantum macro object.

Plasma consists of a collection of free-floating electrons and ions atoms that have lost electrons. Plasmas are generated by transforming a gaseous substance from a neutral state using energy to cause the formation of charge carriers. Electrons and ions are produced in the gas phase when electrons or photons with sufficient energy collide with the neutral atoms and molecules in the feed gas (electron-impact ionization or photo ionization). There are various ways to supply the necessary energy for plasma generation, such as with thermal, electrical, or light/radiation energy—energy in the form of ultraviolet or intense light from a laser or microwave. One possibility is to supply thermal energy, for example in flames, where exothermic chemical reactions of the molecules are used as the prime energy source. Adiabatic compression of a gas is also capable of heating the gas to the point of plasma generation. Yet another way to supply energy to a gas reservoir is through the introduction of energetic beams that moderate in a gas volume. Any volume of a neutral gas always contains a few electrons and ions that are formed. These free charge carriers may be accelerated by an energy source, such as high frequency microwave radiation, so that new charged particles are created when the charged carriers collide with the atoms and molecules in the gaseous substance. This leads to an avalanche of charged particles that is eventually balanced by charge carrier losses, so that a steady-state plasma develops. In addition, this energy is required to be sustained in order to maintain the plasma state. In the event the energy is lost or discontinued, the plasma reverts back to or recombines into its neutral gaseous form.

Referring back to FIG. 1, if a gaseous substance (e.g. air) is forced to ionize very quickly and completely enough so that the energy absorbed by the atomic nucleus is low and the energy is transferred or channeled into the electrons instead of the atomic nuclei, the complex ionized atomic nuclei that result could lay outside the determined area of existence of the substance. The protonic (nucleon) gas component of the atomic nuclei can become a structureless unit quite easily, while achieving such a state is very hard for an electron component. A structureless unit is simply one way of describing a particle outside the ordered world and within the quantum boundaries.

Normal proton (nucleon) matter occurs predictably in a determined region of matter in the universe. A homogeneous gas, such as hydrogen for example, when subjected to gradual heating, becomes completely ionized at a certain temperature ($T_i$-$10^5$ K). Its atoms disassociate, thus disintegrating to their component electrons and atomic nuclei. The result of this disintegration is ordinary hydrogen plasma. It occupies a position above the quantum boundary $R_{k,p}$ because the initial gas volume has expanded (that is, the distance R between the neighboring particles-nuclei has increased) or the average energy per particle has increased. The plasma is at point 4 in the determined quantum region as shown in FIG. 1.

If as stated, however, the hydrogen gas is forced to ionize very quickly and very completely, so that the energy absorbed by the atomic nuclei is low, the atomic nuclei that result could lie outside the determined region, such as at point 3 in FIG. 1. Experiments carried out by many scientists have established with certainty that ordinary (determined) plasma cannot initiate stable plasma states/formations, but abnormal (undetermined) plasma can.

Step 4—Transforming the Plasma Into a Quantum Macro Object

As the quantum macro object of the present invention is believed by the inventor to possess and exhibit similar properties and characteristics as the naturally occurring phenomenon ball lightning, and according to documented observations and many popular opinions that ball lightning has stored therein, and is capable of expending, extremely large amounts of energy, it follows that the quantum macro object of the present invention also is believed to possess a great amount of potential energy. Through the creation of the quantum macro object, generation of quantum energy becomes possible as this potential energy is converted and released as high-energy photons.

Upon reaching a suitable plasma or plasma state 166 according to the process described above, the next step involves the transformation or transition of plasma 166 into a quantum macro object. As mentioned, dielectric container 150 is not required to be evacuated prior to the creation of a quantum macro object. However, in the event vacuum means 156 is used to facilitate the formation of plasma 166, once plasma 166 is formed, vacuum means 156 is turned off in order to allow the gas pressure within dielectric container 150 to be increased.

Figure 6:
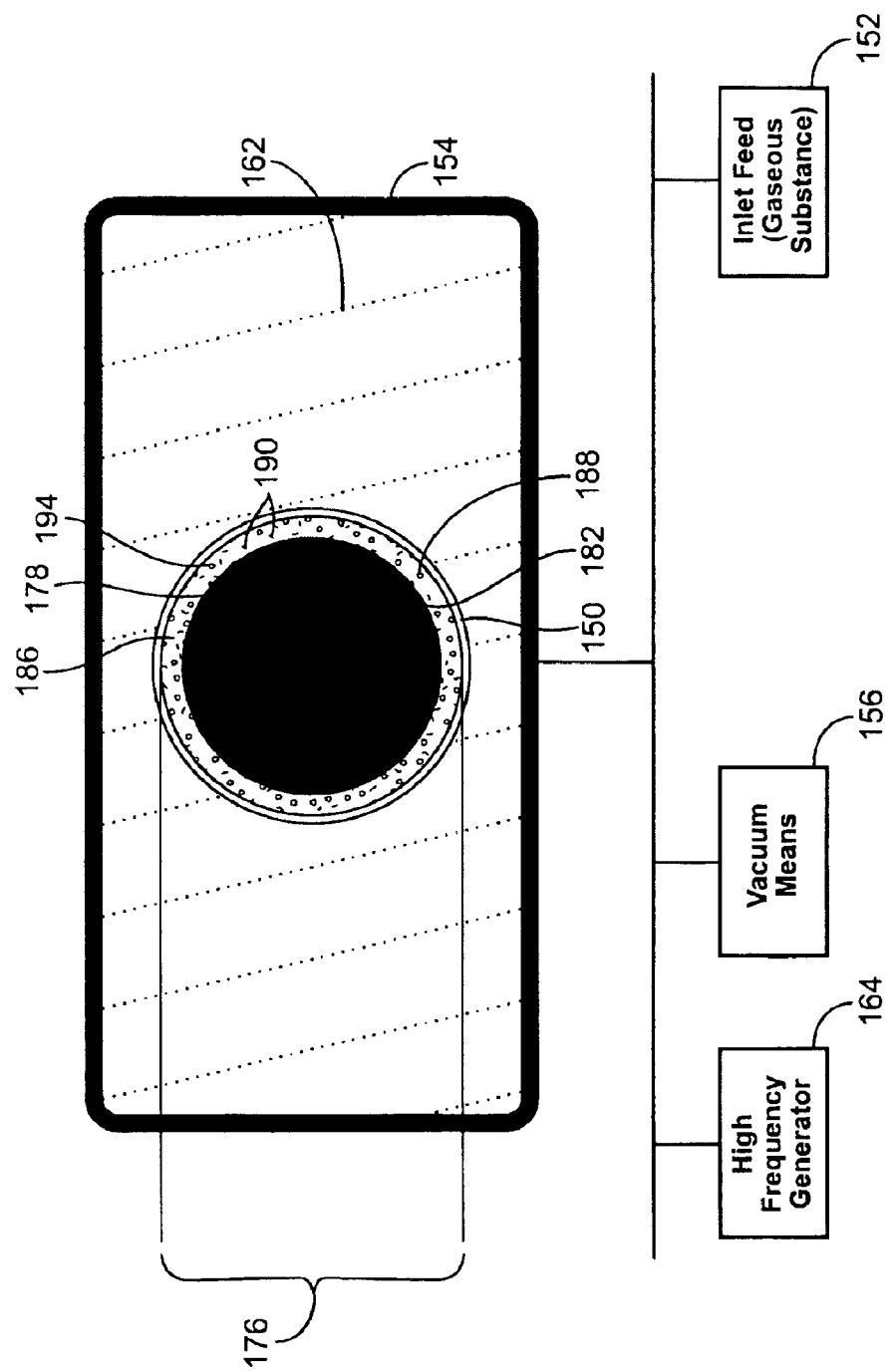
FIG. 6 illustrates another step in one method of generating quantum energy, specifically, the creation of a quantum macro object within a dielectric container as transitioned from the plasma.

FIG. 6 illustrates the "new" state quantum macro object 176 of the present invention as generated from plasma 166 of FIG. 5. Quantum macro object 176 is shown contained within dielectric container 150 and radiation chamber 154.

The process of transforming plasma 166 to a "new" state or into a quantum macro object 176 involves several steps. It should be noted that during this process and throughout the maintenance of the quantum macro object and generation of quantum energy, radiation 162 is required to be continuous and ongoing within radiation chamber 154 for the purpose of providing the required conditions to sustain quantum macro object 176 for the duration of the generation of quantum energy. After plasma 166 is generated, the gas pressure in dielectric container 150 is increased at a calculated rate. In one experiment, the gas pressure was increased over a time span of approximately two minutes to a pressure of 1 atm. Increasing the gas pressure within dielectric container 150 causes plasma 166 to begin to transition to quantum macro object 176. As the gas pressure is increased, the more visible and defined quantum macro object 176 appears. Specifically, the component particles or atomic nuclei in the plasma (shown as 170 and 174 in FIG. 5) separate and "melt" together. During this process, the atomic nuclei 170 essentially lose their individuality or identity. What results is a autonomous and homogenous positively charged nucleus 178 and an adjacent electron cloud 186 surrounding positively charged nucleus 178 to form a quantum macro object 176. The two major components of quantum macro object 176—the positively charged nucleus 178 and electron cloud or shelf 186—along with quantum macro object 176 itself, possess unique properties and characteristics.

First, electron cloud 186 contains a plurality of highly excited electrons (quantwn electrons) 188 within the quantum realm (i.e. above the minimum energy level 198 in FIG. 7), as well as a number of free-floating electrons 190. Quantum electrons 188 are associated directly with quantum macro object 176, while free-floating electrons 190 are not associated with quantum macro object 176. It is believed that quantum electrons 188 have enormous potential energy as a result of their unique quantum state, and that this potential energy may be released and converted into useful kinetic energy (quantum energy). Moreover, it is important to note that since quantum electrons 188 obtained this energy as a free gift of nature, the quantum energy radiated from quantum electrons 188 is continuous and ongoing, without loss, as long as the conditions are maintained that enabled the creation of quantum object 176.

Second, positively charged nucleus 178 has no definite internal structure. Its individual nuclei are undistinguishable. As a result, forces of attraction between the nuclei weld them together, thus creating a relatively stable and structureless nuclear formation. The nuclei have "melted" and disappeared, ceasing to be individual nuclei.

Moreover, positively charged nucleus 178 is similar to and has similar properties and characteristics as the nucleus of micro atoms. Therefore, positively charged nucleus 178 comprises or possesses a distinct and identifiable boundary 182 and an electron cloud 186 directly adjacent boundary 182 of nucleus 178. In addition, it is believed that positively charged nucleus 182 is a two-dimensional object, while electron cloud 186 exists in three-dimensional space.

The nuclear forces causing cohesion among the nuclei of the quantum macro object have the same nature as those in the ordinary atomic nuclei as explained above. Referring again to FIG. 1, on passing beyond the quantum boundary $R_{k,p}$ the electromagnetic forces of repulsion between the atomic nuclei of the same, positive charge become even more powerful forces of attraction.

The nuclear forces of cohesion provide the stability of the quantum macro object, just as in naturally occurring ball lightning. The nucleons in the nucleus lose their individuality because the average distance (R) between them is less than $R_{k,p}$, forming a structureless quantum macro object. In addition, each electron in the quantum macro object is distinguishable and individual, has its own value parameters, and helps form the electron-determined cloud component of the quantum macro object.

One significant advantage of the quantum macro object of the present invention is that it is believed by the inventor to be a giant macro atom, thus possessing similar properties and characteristics as those micro atoms existing within the boundaries of the ordered world and as commonly understood. Because the quantum macro object is an enormous atom, Pauli's principle is operational within the electron cloud of the quantum macro object—it is impossible to have two or more electrons that exist in the same quantum state.

Briefly, an atom consists of an electron cloud surrounding a dense nucleus of protons and neutrons. Because of the opposite charges of an electron and the particles (protons) in the nucleus, there is an attraction between the electrons and the nucleus. It is this attraction that holds the atom together.

It is commonly accepted that electrons in an atom behave as both particles and waves, a characteristic called wave-particle duality. Wave-particle duality affects all particles and collections of particles, including protons, neutrons, and the atoms themselves. In regards to the atom, it is accepted that the wavelike structure of the electron is most important, with these electrons occupying orbitals having determined levels of energy in the form of kinetic and potential energy. Moreover, in a stable atom, the orbitals in the atom just occur at certain distances from the nucleus.

Figure 7:
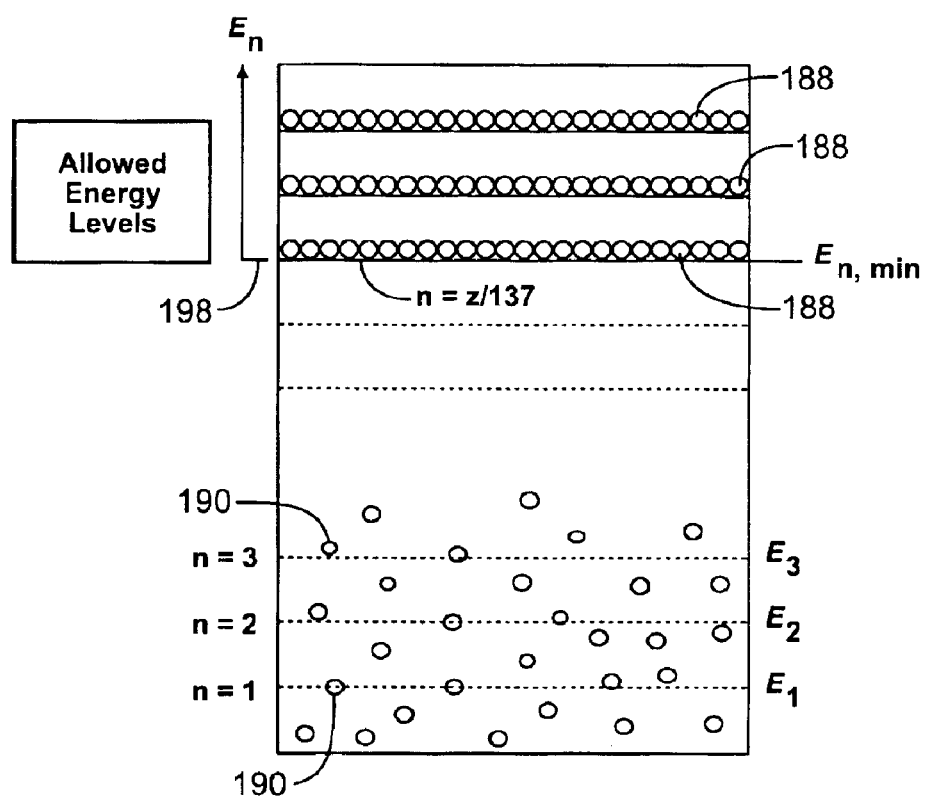
FIG. 7 is an illustrative chart showing the energy levels of the quantum electrons and the energy level where these electrons are within a high-energy quantum state.

As shown in FIG. 7, the number of half-wavelengths that an orbital allows is known as the orbital's principal quantum number (abbreviated n), which in general, determines the size of the orbital. When electrons collect around an atom's nucleus, they fill up orbitals in a definite pattern. In short, the electrons seek the first available orbital that takes up the least amount of energy to occupy. Generally, it takes more energy to occupy higher level orbitals (e.g. quantum levels—those within the quantum realm). Therefore, those electrons that occupy high levels will possess high amounts of potential energy. As an atom fills orbitals with electrons based upon availability, once the lower levels are filled an electron has no choice but to occupy the next highest level. Therefore, a sufficient number of free floating electrons are available within the dielectric container 150, which occupy the lower levels. The amount of electrons which can occupy the "n" energy level is: $n-1$, $1=0\Sigma(21+1)=n^2!$, where 1,n are the main quantum numbers. According to the principle of economy, the quantum macro object, and particularly quantum electrons 188, occupy quantum energy levels, shown as 198.

Moreover, each electron in an atom possesses a particular energy. This energy depends upon the electron's speed, the presence of other electrons, the electron's distance from the nucleus, and the positive charge of the nucleus. Atoms gain energy in various ways. When an atom absorbs energy, one or more of its electrons moves to a higher, more energetic orbital. When electrons drop back down to their original energy states, they release their extra energy in the form of photons. Those electrons in the lower orbitals release much greater amounts of energy due to their attraction to the nucleus and difficulty in being excited. If quantum electrons 188 radiate some energy then this energy can be only its full quantum energy. After this radiation, the quantum energy of the electron is restored instantaneously. Quantum energy cannot be divided in smaller parts. In other words, the energy spectrum of the radiating energy is discontinuous.

Referring back to FIG. 6, these basic principles are equally applicable to quantum macro object 176 of the present invention as this quantum macro object is believed to be a giant macro atom. As mentioned, the proton (nucleon) component of the gaseous substance can become a structureless quantum plasma body quite easily, while achieving such a state is impossible for the electrons because the boundary $R_{k,e}$ is much lower than the boundary $R_{k,p}$ (as shown in FIG. 1). However, as this state is achieved, a plasma may be transitioned or transformed into a "new" state, which state is believed to be similar to that existing within naturally occurring ball lightning. The "new" state of the present invention is believed to possess similar properties and characteristics as a micro atom. This is the proposed state of quantum macro object 176. The plasma generated from the gaseous substance provides the necessary matter and particles needed to generate quantum macro object 176, with its associate plurality of particles 194, free-floating electrons 190, and quantum electrons 188 that are in a highly excited quantum energy state and that are contained within electron cloud 186.

One advantageous characteristic of the present invention, made possible through the creation of quantum macro object 176, is its ability to generate and maintain a highly intense electrostatic field, without experiencing dielectric breakdown. When two objects in each other's vicinity have different electric charges, an electrostatic field exists between them. An electrostatic field also forms around any single object that is electrically charged with respect to its environment, such as positively charged nucleus 178 of quantum macro object 176 as surrounded by the negatively charged electron cloud 186 in combination with the plurality of free-floating electrons 190 that are not associated with quantum macro object 176, but remain between nucleus 178 of quantum macro object 176 and dielectric wall 210 present within dielectric container 150 (see FIG. 9).

An object is negatively charged (−) if it has an excess of electrons relative to its surroundings. On the other hand, an object is positively charged (+) if it is deficient in electrons with respect to its surroundings. Electrostatic fields bear some similarity to magnetic fields. Objects attract if their charges are of opposite polarity (+/−); objects repel if their charges are of the same polarity (+/+ or −/−). The lines of electrostatic flux in the vicinity of a pair of oppositely charged objects are similar to lines of magnetic flux between and around a pair of opposite magnetic poles. Electrostatic fields arise from a potential difference or voltage gradient, and can exist when charge carriers, such as electrons, are stationary. The intense electrostatic field created by the present invention results from the relatively small distance between highly excited quantum electrons 188 in the quantum level and positively charged nucleus 178. This is evident from FIG. 8.

Figure 8:
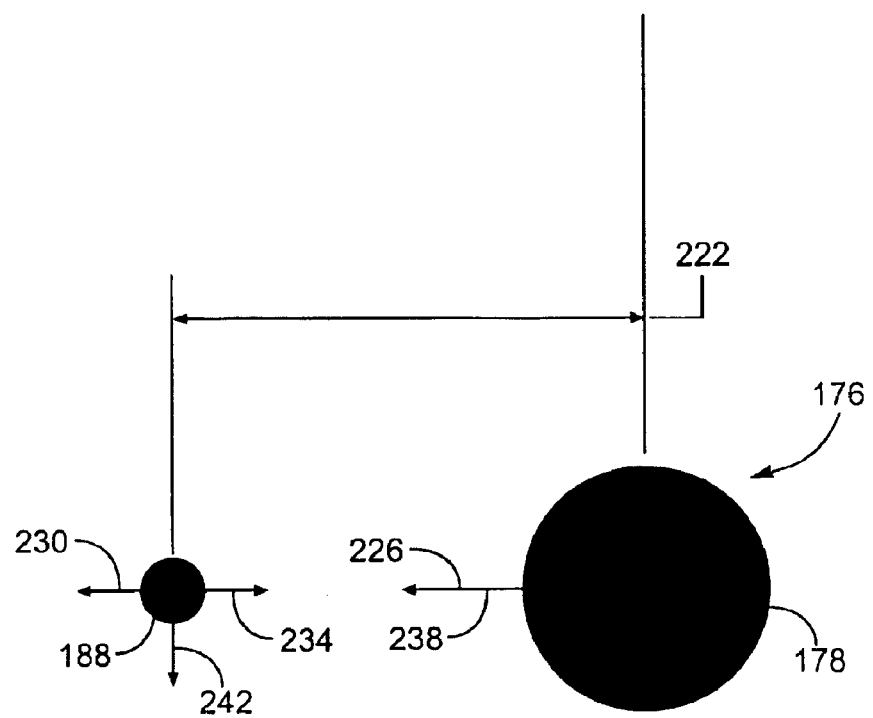
FIG. 8 illustrates the relationship between a quantum electron and the nucleus of the quantum macro object.

FIG. 8 illustrates positively charged nucleus 178, which may be considered a material point without spatial dimensions, and a single quantum electron 188 at a distance of $r_{min}$ 222. Positively charged nucleus 178 has a velocity 238 and $F_{cul}$ 226. Quantum electron 188 also has a velocity 234 (v=c), and also has an orbital velocity 242 and $F_{center}$ 230. These conditions serve to create an intense electrostatic field within quantum macro object 176.

Figure 9:
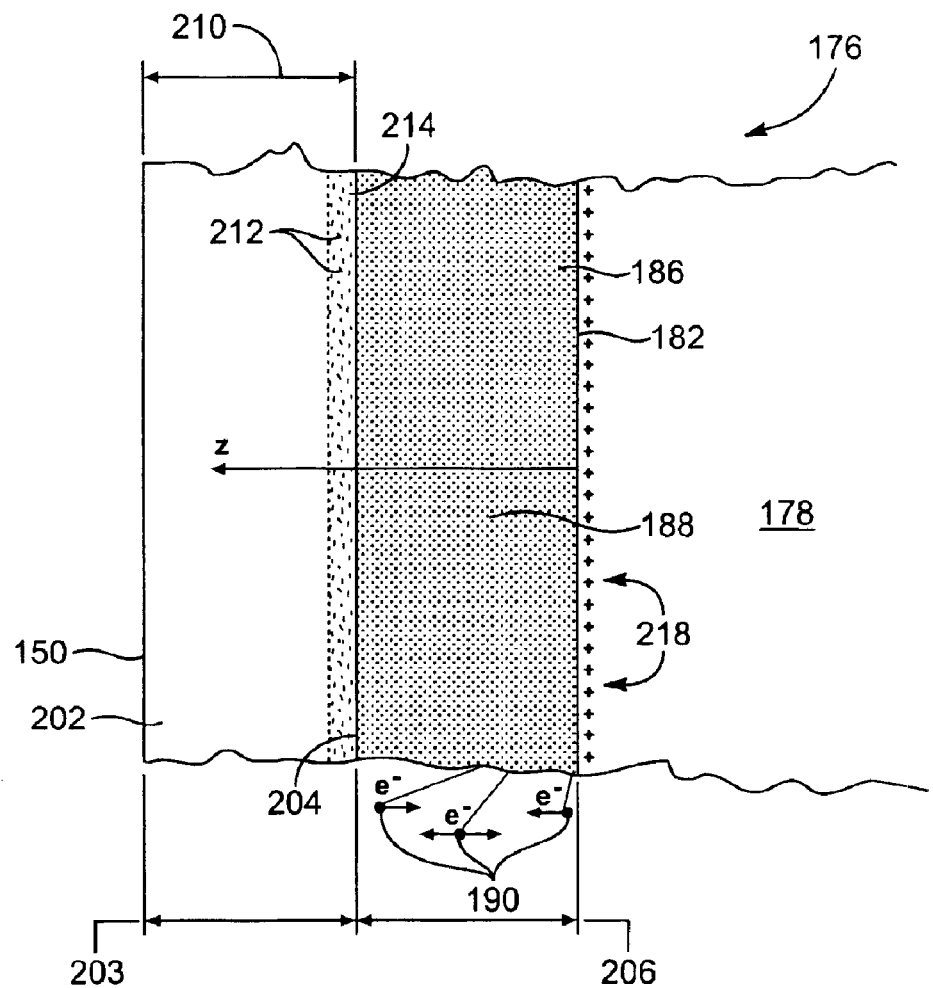
FIG. 9 is a sectional view illustrating the details of the quantum macro object, specifically, the nucleus and the electron cloud, and the relationship of these with the dielectric container to produce the double electron barrier or shield.

Referring to FIG. 9, this field is made possible as a result of several factors, such as the use of low-dielectric constant materials and mediums or substances that are used to generate quantum macro object 176, the current and resulting voltage across these dielectric materials or substances, and the double electron barrier created between dielectric container 150 and positively charged nucleus 178. Shown in detail in FIG. 9, dielectric container 150 comprises a container wall 202 having a thickness 203 sufficient to support the intense electrostatic field generated by the present invention. Container wall 202 is comprised of a dielectric wall 210. Dielectric wall 210 comprises a plurality of charged electrons 212 that form to make up electron layer 214 within thickness 203 of dielectric wall 210. Electron layer 214 is naturally adjacent inside edge 204 of dielectric wall 210.

Also shown in detail, is quantum macro object 176 and its component parts, nucleus 178 and electron cloud 186. Nucleus 178 is shown as being positively charged 218 at boundary 182. In addition, electron cloud 186 is shown having a number of free-floating electrons 190 therein that interact with each other, nucleus 178, and dielectric container 150. Specifically, free-floating electrons 190, and quantum electrons 188 that exist to make up electron cloud 186 are contained within the double electron or dielectric barrier created between electron layer 214 of dielectric wall 210 and positively charged nucleus 178. This barrier serves an important and advantageous purpose in this particular embodiment by confining free-floating electrons 190 to a specific area where they may sustain the vitality of quantum macro object 176. Without dielectric wall 210 and the dielectric barrier created between this wall and positively charged nucleus 178, free-floating electrons 190 would be free to move about unconstrained. In essence, this same principle is at work in nature when naturally occurring ball lightning is created. Given the proper environmental conditions, a natural plasma state (e.g. charged air) may be achieved that is confined within a dielectric wall or barrier formed by the charged air. The particles, and particularly the electrons, are confined within this barrier, meaning the electrons are prohibited from freely floating as they normally would. In this condition, the confined electrons may be actively impacted (e.g. typically by lightning), wherein ball lightning may be created. This explains why most recorded or observed instances of ball lightning have occurred during thunderstorms.

Step 5—Inducing an Active Impact on the Quantum Macro Object to Generate Quantum Energy Stated simply, there is an enormous amount of potential energy existing within quantum macro object 176, and particularly within quantum electrons 188, that may be released in the form of high-energy photons or quantum energy. This quantum energy is potential energy converted into useful kinetic energy and is believed to be free energy provided by nature.

The realization of quantum energy is predicated upon the generation of quantum macro object 176 (in this embodiment, quantum macro object 176 is created within a dielectric barrier). However, although in a highly excited quantum energy state (see FIG. 7), quantum electrons 188, without more, do not radiate energy or quantum energy. Rather, they must be appropriately acted upon and energized before the potential energy existing within each electron is released and converted into kinetic energy. Only then do they begin to radiate various heat and light emissions. Once a suitable quantum macro object exists, this further step of inducing an active impact upon quantum macro object 176, and particularly quantum electrons 188, is required to convert potential energy into useful kinetic energy. It is this active impact upon quantum macro object 176 that provides the appropriate active impact needed to energize quantum electrons 188 and cause them to radiate quantum energy.

Figure 10:
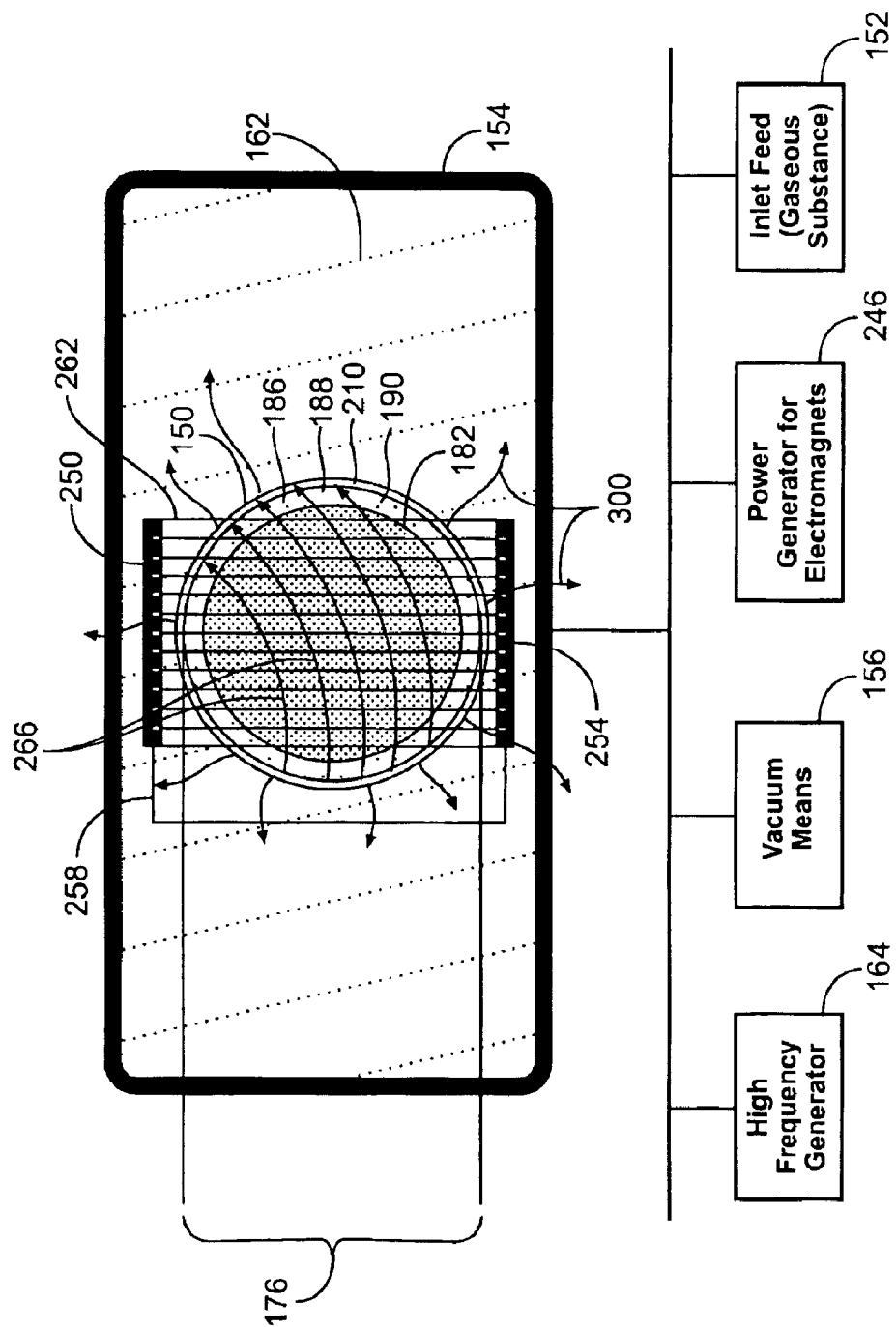
FIG. 10 illustrates another step in one method of generating quantum energy, specifically, shown is the step of inducing an active impact on the quantum macro object, using an electromagnetic field, to excite the electrons and to produce quantum energy.
Figure 11:
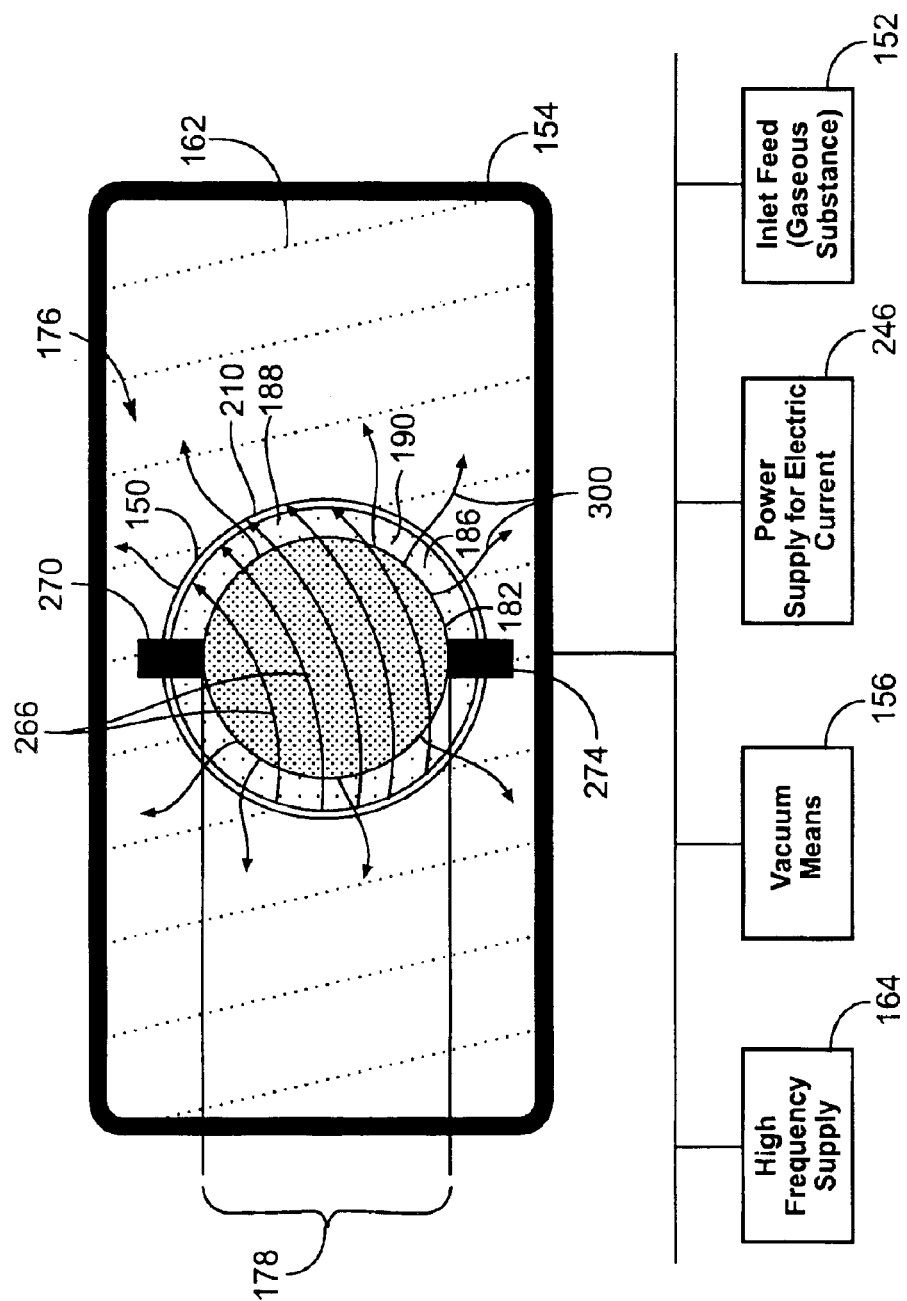
FIG. 11 illustrates another step in one method of generating quantum energy, specifically, shown is the step of inducing an active impact on the quantum macro object, using a current introduced through electrodes, to excite the electrons and to produce quantum energy.

The process or step of inducing an active impact upon quantum macro object 176 is illustrated in FIGS. 10 and 11. As before, these illustrations are merely presented as examples of two possible methods (and systems) that may be used to induce an active impact upon a created quantum macro object, and one ordinarily skilled in the art will recognize that other methods and systems may exist to accomplish the intended result.

The active impact used to energize quantum macro object 176 stems from the movement of the electrons and other particles within the quantum macro object, namely quantum electrons 188, and free-floating electrons 190. Movement of the electrons is accomplished by inducing a current across quantum macro object 176 as generated from some power source. Power$_{input}$ dictates the amount of electrons present. Various levels of Power$_{input}$ are presented below in the several examples. It should be noted however, that the excitement current must be at least 2 amps, and preferably greater than 5 amps, with a voltage of at least 2,000 volts. To create a larger, more intense quantum macro object, one would simply increase Power$_{input}$ of the high frequency radiation to a greater level as the level of Power$_{input}$ determines the properties of quantum macro object 176 and the quantum energy produced therefrom.

FIG. 10 shows radiation chamber 154 being inundated or bombarded with high frequency radiation 162 as provided by high frequency supply 164. As stated, high frequency radiation must be continuous to sustain the life of quantum macro object 176 this is because as quantum electrons 188 radiate energy, they are instantaneously renewed by the conditions existing within quantum macro object 176. Also shown in FIG. 10 is the type of system or device used to induce the active impact upon quantum macro object 176. Specifically, shown is an electromagnetic field generator comprising a dipole of magnetic source 250 (shown as upper electromagnet) and magnetic sink 254 (shown as lower electromagnet). Lead 258 is used to connect magnetic source 250 to magnetic sink 254, and power supply 246 is used to generate and supply the necessary power to magnetic source 250. Electromagnetic fields are well known in the art, therefore, they are not discussed in detail herein. However, it should be noted that the electromagnetic field is preferably supplied by a pulse electromagnetic field supply in order to reduce the size of the equipment in the system. A pulse electromagnetic supply is capable of inducing very strong electrical currents in electron cloud 186.

Basically, when power supply 246 is turned on, magnetic source 250 causes to be produced magnetic flux 262, which carries an identified voltage and current that are used to actively impact quantum macro object 176. However, due to the characteristics and properties of quantum macro object 176, magnetic flux 262 is unable to penetrate nucleus 178 because of its two-dimensional nature. As a result, magnetic flux 262 is forced to move without boundary 182 of nucleus 178, which causes magnetic flux 262 and the current being carried therein, to directly and actively impact quantum electrons 188 and free-floating electrons 190 in electron cloud 186. This active impact energizes quantum electrons 188 and causes them to begin to move about quantum macro object 176 in an orbital manner, with these orbiting electrons being represented by lines 266. Movement of quantum electrons 188 is in an orbital or circular manner around positively charged nucleus 178, and within electron cloud 186, as they are not allowed to penetrate positively charged nucleus 178 due to its nature. It is this orbital movement about quantum macro object 176 that converts the enormous potential energy existing within quantum electrons 188 into kinetic energy. Essentially, the orbital motion causes quantum electrons 188 to begin to radiate high-energy photons, thus expelling the quantum energy derived from these electrons.

Specifically, once a sufficient level of current is applied such that free-floating electrons are not allowed to serve as carriers to the induced current, quantum electrons 188 take over and act as carriers of the induced current. Every quantum electron 188 has two states. The first state is when it exists having quantum energy $E_n$. The second state is when it acts as a carrier to the induced current and begins to radiate high-energy photons. In this state, when acting as a carrier, quantum electron 188 orbits with kinetic energy, $E_k$. The kinetic energy $E_k$ is equal to the potential quantum energy $E_n$ existing within or possessed by quantum electron 188. Moreover, orbiting around positively charged nucleus 178, quantum electrons 188 radiate high-energy photons due to the centrifuge acceleration $a_c$. The radiated high-energy photons possess energy $E_n$ (quantum energy), which cannot be divided in smaller portions. After this initiated radiation, quantum energy is restored instantaneously within quantum object 176, again due to the Pauli's exclusion principle. As such, quantum object 176 provides an inexhaustible reservoir of energy.

In order to properly energize quantum macro object 176, the input power level, and specifically the voltage and current used generated by power supply 246, must strong enough so that quantum electrons 188 carry the induced current and not free-floating electrons 190. This may be defined as the impact threshold. This impact threshold is typically overcome by supplying a minimum input power of about 1,000 watts, having a minimum input current of about 2–5 amps. If the input current is weak, then quantum macro object 176 will not be properly energized and the current will simply be picked up and carried by free-floating electrons 190. The power introduced does not have to be immediately above the impact threshold value. It may start below the threshold and then be gradually increased until it is of sufficient strength to energize quantum electrons 188. Having said this, it should be noted that the greater the current in the power level the greater the amount of quantum energy that will be produced or radiated. Thus, by simply increasing the level of current input from power supply 246, the intensity and amount of quantum energy produced is also increased.

FIG. 11 shows another way that may be used to create the active impact upon quantum macro object 176. Specifically, FIG. 11 shows a first and second electrode 270 and 274, respectively attached to power supply 246. Unlike the electromagnetic field produced by the method and system described in FIG. 10, an electric current is generated between first electrode 270 and second electrode 274. Again, due to the properties and characteristics of quantum macro object 176, the resulting current is unable to penetrate nucleus 178 of quantum macro object 176 because of its two-dimensional nature, but instead travels without boundary 182. If the current is of sufficient strength so as to overcome the impact threshold needed to properly energize quantum electrons 188, quantum electrons 188 will begin to move about positively charged nucleus 178 in an orbital manner as shown by lines 266, at which time they will begin to radiate quantum energy as described above.

The high-energy photons or quantum energy of the present invention may exist in several forms depending upon the conditions satisfied in creating the quantum object and inducing an active impact thereon. Basically, the high-energy photons emitted may cover the entire energy spectrum. For example, as the intensity of radiation is increased and the induced current is strong, the resulting high-energy photons will possess a higher level of energy and cover a different range of the energy spectrum than if the same happened at lower input levels.

Figure 12:
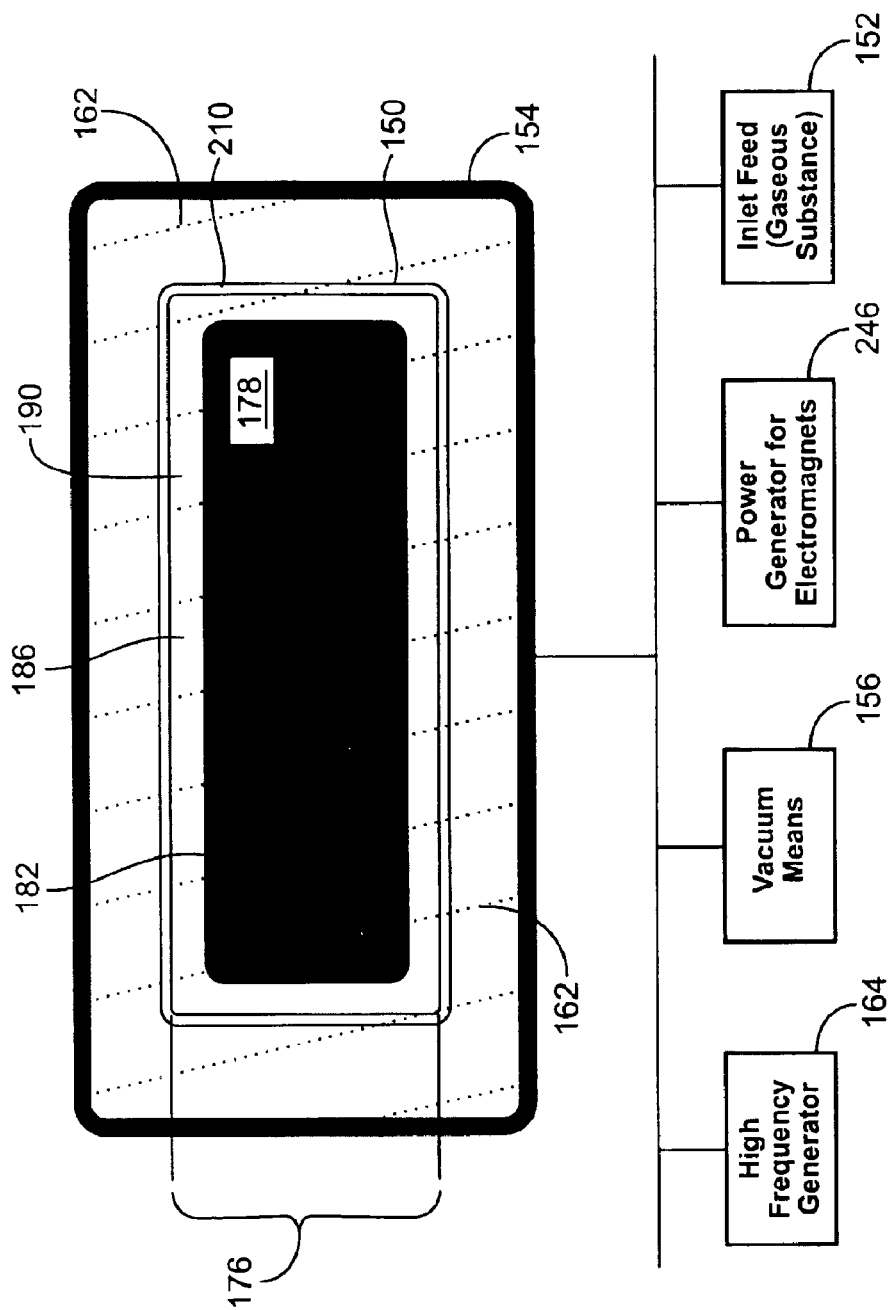
FIG. 12 is illustrative of an alternative embodiment showing how the quantum macro object is not required to be in spherical form.

FIG. 12 is illustrative of another embodiment wherein dielectric container 150 may be in the form of other shapes besides the spherical one used in description above. In this embodiment, dielectric container 150 is cylindrical in shape. From this, one ordinarily skilled in the art will recognize that the present invention may be carried out using various sized and shaped systems.

Figure 13:
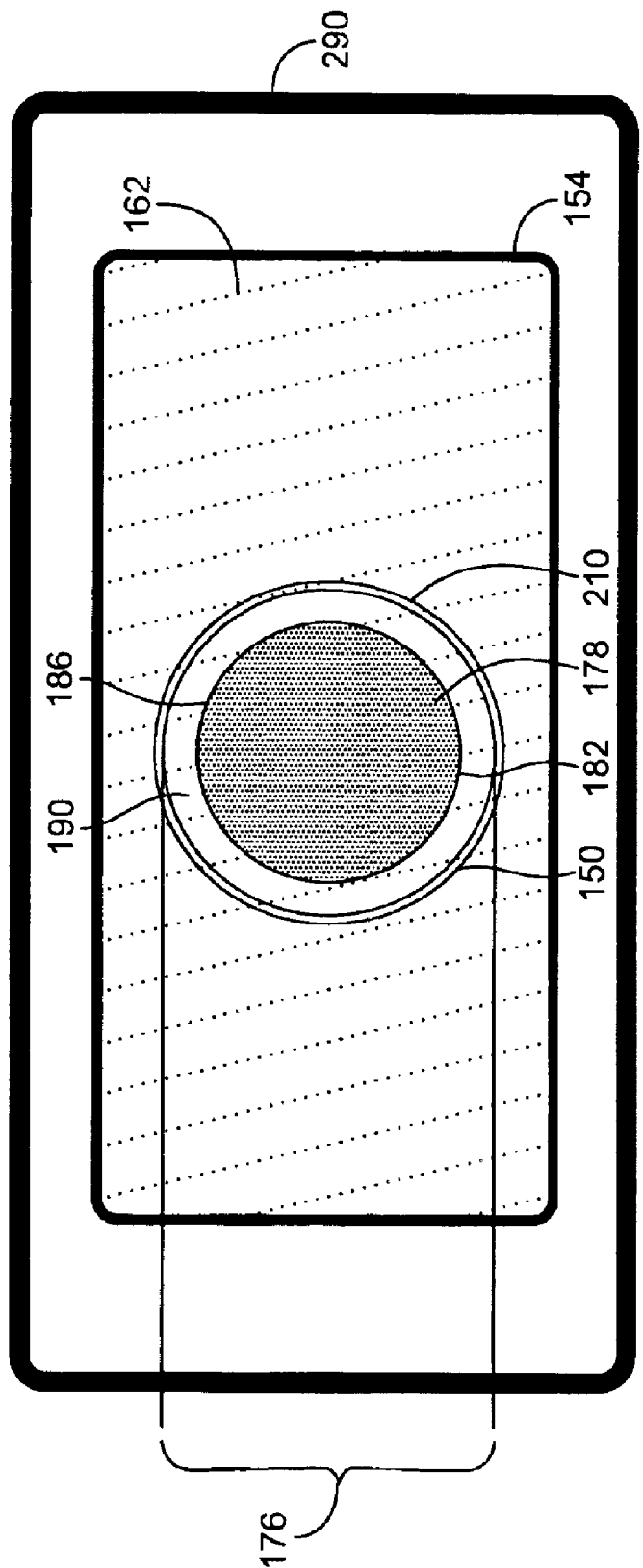
FIG. 13 is illustrative of yet another embodiment, wherein the quantum macro object is created within a pressure vessel.

FIG. 13 depicts the creation of a quantum macro object 176 within a pressure vessel 290. Pressure vessel 290 serves to provide a more dense and compact environment, wherein a significantly greater number of particles are initially present within the gaseous substance. Increasing the initial pressure that the gaseous substance is under during the beginning stages of generating a quantum macro object provides several benefits. One advantage is that it allows the physical system or apparatus used to generate a quantum macro object to be smaller because the same number of particles that may be required to produce a desirable amount of quantum energy in a larger system operating at atmospheric pressure may be packed into a compact unit to produce an equivalent amount of quantum energy. Furthermore, significant costs may be cut, as well as being able to produce relatively small high power quantum energy generators. Other advantages not recited herein may also be realized by those skilled in the art.

Figure 14:
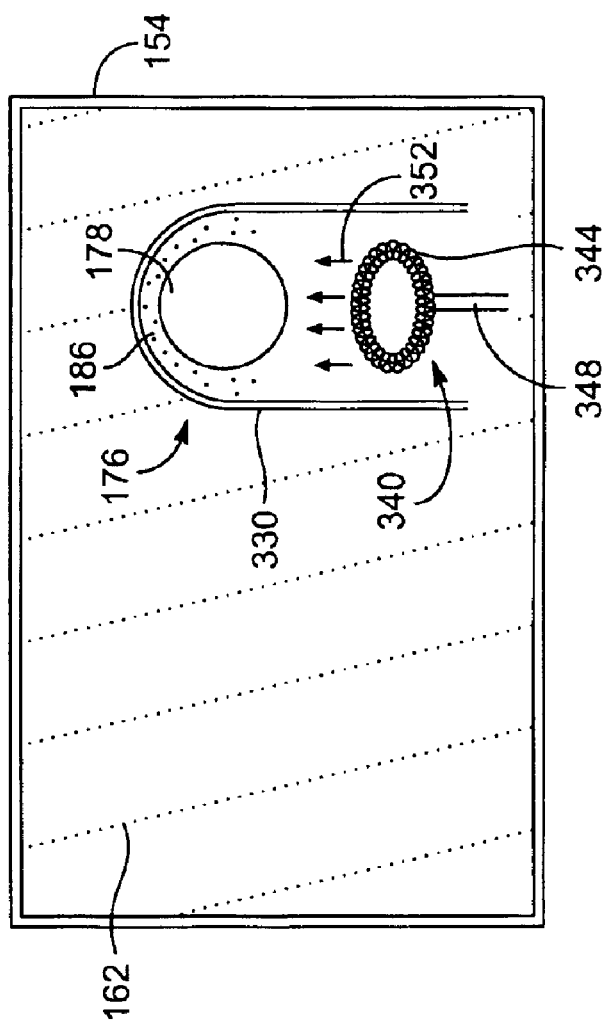
FIG. 14 is illustrative of an alternative embodiment of the present invention, wherein the quantum macro object is produced in an open, non-evacuated container.

FIG. 14 illustrates an alternative embodiment, wherein quantum macro object 176 may be generated using an open dielectric container 330 instead of a closed one as described above. In this embodiment, the process is similar, only open dielectric container 350 is not evacuated, and not plasma is required to create quantum macro object 176.

In this embodiment, dielectric container 330 is open to the atmosphere as present within radiation chamber 154. As such, the process of creating quantum macro object 176 and quantum energy does not include the step of evacuating dielectric container 330. Instead of facilitating the transformation of the gaseous substance to a quantum macro object using a plasma, the gaseous substance (in this case air) is transformed into a quantum macro object plasma state by filling open dielectric container 330 with particles 352, namely electrons. To fill open dielectric container 330 with electrons, particle source 340 is placed within open dielectric container 330. High frequency radiation 162 is activated and caused to bombard or radiate radiation chamber 154. A portion of this radiation 162 comes in direct contact with particle source 340, which in turn produces a plurality of particles, namely electrons 252, that fill open dielectric container 330. As shown, in this embodiment particle source 340 comprises a tungsten coil 344 supported by support member 348. Tungsten is used because of its superior resistivity to breakdown as opposed to other common metals. One ordinarily skilled in the art will recognize other types of metals or substances that may be used to perform the similar function as the tungsten coil, thus this should not be considered limiting in any way.

Once supplied to open dielectric container 330, quantum macro object 176 begins to form possessing the properties and characteristics as described above. Quantum macro object 176 may then be actively impacted to energize quantum electrons 188 within electron cloud 186 to the point where they radiate quantum energy using the processes previously described. These various processes are not shown in FIG. 14 as they are sufficiently described above.

Finally, the quantum macro object of the present invention, and ultimately quantum energy, may be generated within a system that does not utilize either an open or closed container. In this embodiment, the quantum macro object is created within a radiation chamber just as before, but is created within a dielectric formed from the air within the system. Just as before, the radiation chamber provides a sufficient bounded area. Generating a quantum macro object without a container is achieved by creating a dielectric within the radiation chamber. As mentioned above, air is a good dielectric if sufficiently energized. The dielectric is created by providing a significantly increased amount of power input into the system, and particularly, the energizing medium, such as the input power used to generate the high frequency radiation. Thus, by providing enough input power, the air within the radiation chamber will form a dielectric barrier that functions just as the dielectric barrier created by the dielectric container of earlier described embodiments. Within this dielectric barrier, the air is also transformed into a plasma state, after which the plasma is transformed into the quantum macro object of the present invention by increasing the gas pressure within the system. Once the quantum macro object is formed, an active impact may be induced upon the quantum macro object to generate quantum energy. This is discussed in detail above.

The power required to create the dielectric from the surrounding air is at least 15 kW. The power required, however, depends upon whether the air is under pressure, or is simply at atmospheric pressure. This embodiment is particularly useful when large amounts of quantum energy are to be produced. A dielectric container is unable to withstand extremely high levels of input power (greater than 15 kW) and will be destroyed. In this case, the quantum object must be free-floating (i.e. created without a dielectric container and without contact with any solid wall). Again with this embodiment, as in all others, one ordinarily skilled in the art will recognize the various methods and the various equipment and devices that may be used to carry out the processes described herein.

The present invention further features a system for generating high-energy photons. The system comprises a gaseous substance having a plurality of composition particles therein; means for containing said gaseous substance within a bounded area; means for energizing said gaseous substance, and particularly said particles therein, to transform said gaseous substance into a glow discharge plasma state, wherein the particles are separated into their component atomic nuclei and electron parts; means for increasing the gas pressure within the bounded area to transition the glow discharge plasma to a quantum macro object, wherein the quantum macro object comprises a positively charged nucleus and an electron cloud surrounding the positively charged nucleus, the electron cloud comprising a plurality of quantum electrons and a plurality of free-floating electrons, the quantum electrons comprising large amounts of stored potential energy; an energizer for energizing the quantum electrons by inducing an active impact upon the quantum macro object, wherein the quantum electrons are caused to orbit the nucleus of the quantum macro object such that the potential energy stored within the quantum electrons is converted and released in the form of quantum energy.

The means for containing the gaseous substance may comprise various different types, such as an open dielectric container, a closed dielectric container, or a dielectric formed by charged air. A dielectric serves to provide a barrier for the free-floating electrons to keep them within the electron cloud of the quantum object in order that they may be present to sustain the vitality of the quantum object with smaller input power levels.

The means for energizing said gaseous substance may also comprise various types of generators, such as a high frequency supply, an R-F generator, a high-voltage discharge generator, or a high-energy particle beam generator. These are not meant to be limiting in any way. Their specific function, that they be capable of energizing the gaseous substance to transform it into a plasma state, is the most important aspect. However, preferably, the energizer is a high voltage current supply assembly including its associated components, such as an assembly comprising two electrodes coupled to a power supply, or an electromagnetic supply comprising upper and lower electromagnets coupled to a power supply and capable of inducing current through a created electromagnetic field.

The detailed explanation above presents the preferred methods and systems used for generating quantum energy. However, other systems and methods may be employed to produce the intended results. While merely illustrative, the following examples represent theories of possible experiments, and several actually conducted experiments, along with the results obtained from these experiments. These examples are only illustrative and are not intended to be limiting in any way as one ordinarily skilled in the art will recognize various other procedures or methods, or various other components, devices, or systems, that may be implemented or utilized with the technology described and taught herein, but that are not specifically discussed in this disclosure, shown in the Figures presented, or illustrated in these several examples. As such, it is intended that all other methods and/or systems used to produce quantum energy or its equivalent are to be within the scope of the invention as claimed and taught herein.

EXAMPLE ONE

This example represents the method of generating quantum energy as conducted within the constraints and with the system of the preferred embodiment as discussed above.

In this method or experiment, a quartz container having a diameter of three and one half inches, and a wall thickness of 0.4 cm, can be filled with air at normal atmospheric pressure (1 atm). Quartz may be used because of its ability to create a high temperature dielectric within its wall.

The container is placed in a radiation chamber capable of emitting high frequency microwave radiation. Once in place, the volume of the container is evacuated using vacuum means. Once the container is sufficiently evacuated, the high frequency supply is activated, causing the radiation chamber to be filled with microwave radiation, thus in turn, radiating the air within the container. The power level generated by the high frequency supply and input into the system is kept constant at 2,000 watts, with the microwaves being radiated at a frequency of 2.48 GHz. The microwave radiation is continuously supplied via a waveguide at a constant frequency throughout each successive phase of the experiment, with antennas serving to provide a smooth radiation field.

Activating the microwave radiation causes the air within the container to ionize and turn to a plasma state. At this time, the gas pressure within the container is increased slowly over a time period of about 2 minutes, and brought to a final pressure of 1 atm. Increasing the gas pressure within the container at this rate had the effect of causing the plasma to transition to or transform into a "new" state. It is this "new" state that the inventor terms a quantum macro object. This quantum macro object is observed to comprise a positively charged two-dimensional nucleus and an electron cloud containing a plurality of free-floating electrons, and a plurality of quantum electrons occupying quantum states of energy. The free electrons within the electron cloud are observed to be confined within the dielectric barrier formed between the dielectric wall of the container and the positively charged nucleus. Moreover, the positively charged nucleus is observed to have a definite and distinct boundary. Although undetermined, the properties and characteristics of the quantum macro object are believed to behave as a giant macro atom, possessing similar properties and characteristics of micro atoms.

The creation or generation of the quantum macro object is necessary for the production of quantum energy as explained above. However, the quantum macro object, and particularly the quantum electrons within the quantum macro object, do not radiate energy without being acted upon. As such, there must be an active impact induced within the quantum macro object to properly energize the quantum electrons to the point where they are caused to radiate energy. This active impact must be strong enough to overcome the impact threshold of the quantum electrons such that these electrons carry the induced current instead of the free-floating electrons contained within the electron cloud.

In this experiment, the active impact may be created by inducing a high voltage electrical current upon the quantum macro object using an electromagnetic supply and a pair of electromagnets placed opposite one another without and adjacent the container. Once activated, the electromagnetic supply induces an electromagnetic field between the two opposing electromagnets. As is well known in the art, an electromagnetic field produces magnetic flux capable of inducing a current within a suitable carrier. In this case, the carrier is the quantum macro object, and particularly the quantum electrons within the electron cloud.

An input power level produced by the electromagnetic supply at approximately 1600 watts, with the current being approximately 8 amps, and the voltage being approximately 2,000 volts (dropping to approx. 200 watts after current is induced), should yield an output of about 7,000 watts.

The particular power level (i.e. current and voltage) introduced in this experiment is enough to overcome the impact threshold and energize the quantum electrons. If the impact threshold is not overcome (i.e. the power level is insufficient), the current introduced would simply be carried by the free-floating electrons, thus merely creating an electrical discharge across the boundary of the nucleus and not energizing the quantum electrons. In short, no quantum energy is produced because the quantum electrons would not be sufficiently energized. As a result, the power level is determined to be extremely important. The input current level is discovered to have a direct effect upon the amount and intensity of the quantum energy generated. This is true for each of the examples provided herein.

Once activated, the induced high voltage current excites or energizes the quantum electrons, thus causing them to move about the nucleus of the quantum macro object in an orbital manner. In doing so, the quantum electrons emit large amounts of high-energy photons, or quantum energy.

The quantum energy in these particles is measured using a photometer. The measured power produced by these highly energized particles should be about 5,000 watts. In addition, the radiation produced by these highly energized quantum electrons in the form of heat should be about 2,000 watts, for a total power output of about 7,000 watts.

The following table represents a summary of the system, and the theoretical results that should be achieved (i.e. quantum energy generated) from the present experiment.

| | |
|---|---|
| Gaseous Substance: | Air |
| Pressure$_{initial\ (Container)}$: | <1 atm |
| Container: | Diameter: 5–6 in. |
| | Wall thickness: 0.4 cm. |
| | Shape: closed, spherical |
| | Material: quartz |
| Particle source: | Gaseous substance & high frequency radiation |
| Radiation Chamber: | sealed microwave radiation chamber |
| High Frequency Radiation Generator: | Type: microwave radiation |
| | Power$_{input}$: ≈2,000 watts |
| | Frequency: ≈2.48 GHz |
| Evacuation Level (Container): | Complete or total evacuation of container |
| Rate of Pressure Increase w/in Container: | Over period of about 2 minutes |
| Pressure$_{final\ (Container)}$: | 1 atm |
| Current Generator (active impact): | Type: electromagnetic supply |
| | Power$_{impact}$: ≈1,600 watts |
| | Current: ≈8 amps |
| | Voltage: ≈2,000 volts |
| Quantum Energy Generated: | Type: heat, high-energy photons, x-rays, gamma rays, other |
| Power$_{Input-total}$ (Power$_{HF\ Generator}$ + Power$_{Current\ Generator}$): | ≈3,600 watts |
| Power$_{output-total}$: | ≈7,000 watts |

EXAMPLE TWO

The following example is identical to that of Example One, except the active impact is created using a high voltage electrical current generated by two opposing electrodes as shown in FIG. 11.

In this experiment, two electrodes made of tungsten material were placed within the dielectric container a distance apart from each other. These electrodes were coupled to a power supply that generated an input power level of approximately 1,600 watts, with a current of approximately 8 amps and a voltage of approximately 2,000 volts.

Tungsten was used because of its superior resistance to the high-energy quantum electrons over other common metals, such as copper, or brass and their alloys. These other materials were quickly destroyed by the high-energy quantum electrons and the quantum high-energy photons radiated from these electrons. Once destroyed, the system lost its ability to actively impact the quantum macro object. As a result, the quantum electrons were no longer energized and the production or generation of quantum energy ceased. However, although tungsten is more resistive, eventually the electrodes are destroyed and must be replaced to continue the production of quantum energy.

Like the electromagnetic field, if the high voltage current is insufficient to overcome the impact threshold of the quantum electrons to where they were energized, the high voltage current would merely be carried by the free-floating electrons within the electron cloud producing an electric discharge between the two electrodes. Although the creation of an electric discharge meant the quantum electrons were insufficiently energized and no quantum energy was being generated, this discharge led to an important observation. Instead of traveling in a straight line from one electrode to another through the nucleus of the quantum macro object (as would be the least resistive pathway for an electric current), the electric discharge was observed as traveling around or outside the nucleus. This phenomenon bolsters the contention by the inventor that the quantum macro object is a two-dimensional object with no interior volume, and that the quantum macro object is a giant macro atom.

The following table represents a summary of the system used, and the results achieved (i.e. quantum energy generated) from the present experiment.

| | |
|---|---|
| Gaseous Substance: | Air |
| Pressure$_{initial\ (Container)}$: | 1 atm |
| Container: | Diameter: 4 in. |
| | Wall thickness: 0.4 cm. |
| | Shape: closed, spherical |
| | Material: quartz |
| Particle source: | Gaseous substance & high frequency radiation |
| Radiation Chamber: | sealed microwave radiation chamber |
| High Frequency Radiation Generator: | Type: microwave radiation |
| | Power$_{input}$: ≈2,000 watts |
| | Frequency: ≈2.48 GHz |
| Evacuation Level (Container): | Complete or total evacuation of container |
| Rate of Pressure Increase w/in Container: | Over period of 2 minutes |
| Pressure$_{final\ (Container)}$: | 1 atm |
| Current Generator (active impact): | Type: high voltage transformer |
| | Power$_{input}$: ≈1,600 watts |
| | Current: ≈8 amps |
| | Voltage: ≈2,000 volts (drops to ≈200 volts) |
| Quantum Energy Generated: | Type: heat, x-rays, high-energy photons, such as gamma rays, betatron, infrared, microwaves, visible light, other |
| Power$_{Input-total}$ (Power$_{HF\ Generator}$ + Power$_{Current\ Generator}$): | ≈3,6000 watts |
| Power$_{output-total}$: | ≈7,000 watts |

EXAMPLE THREE

In this experiment, the closed dielectric container described in Example One was replaced with an open container similar to the one shown in FIG. 14 for the purpose of determining whether the quantum macro object could still be generated under without having to evacuate the container. Indeed, due to the openness of the container, it was impossible to evacuate the container. In this respect, the quantum macro object would be created under conditions closer resembling those in which natural ball lightning is created. Again, air was used as the preferred gaseous substance. In addition, the container was made of quartz to allow for the creation of a high temperature dielectric within its walls.

Similar to Example One, the input power level of the high frequency radiation was generated at 2,000 watts, and at a frequency of 2.48 GHz. This level of power was required to ionize the air and to generate the quantum macro object within the container. The high frequency radiation was microwave radiation generated from a high frequency supply.

The main difference between the present experiment and the first two examples or experiments is that the present experiment utilized an electron gun in the form of a tungsten coil to create the necessary particles (e.g. electron components) within the container. The tungsten coil was placed directly beneath the opening of the container. To fill the open container, high frequency radiation was activated. This radiation directly contacted the tungsten coil, which produced a plurality of electrons within the open container. See FIG. 14 and corresponding explanation.

As the power was continuously supplied, the quantum object began to appear. Once the quantum macro object was produced, an active impact, similar to the one described in Example One, was introduced upon the quantum macro object, wherein quantum energy was generated.

The following table represents a summary of the system used, and the results achieved (i.e. quantum energy generated) from the present experiment.

| | |
|---|---|
| Gaseous Substance: | Air |
| Pressure$_{initial\ (Container)}$: | 1 atm |
| Container: | Diameter: 4 in. |
| | Wall thickness: 0.4 cm. |
| | Shape: cylindrical |
| | Material: quartz |
| Particle Generator: | Type: tungsten coil |
| Particle Source: | tungsten coil; gaseous substance; & high frequency radiation |
| Radiation Chamber: | radiation chamber |
| High Frequency Radiation Generator: | Type: high frequency microwave radiation |
| | Power$_{input}$: ≈2,000 watts |
| | Frequency: ≈2.48 GHz |
| Evacuation Level (Container): | None |
| Rate of Pressure Increase w/in Container: | None |
| Pressure$_{final\ (Container)}$: | 1 atm |
| Current Generator (active impact): | Type: electromagnetic supply |
| | Power$_{input}$: ≈1,600 watts |
| | Current: ≈8 amps |
| | Voltage: ≈2,000 volts |
| Quantum Energy Generated: | Type: heat; high-energy photons, x-rays, gamma rays, other |
| Power$_{Input-total}$ (Power$_{HF\ Generator}$ + Power$_{Current\ Generator}$): | ≈3,600 watts |
| Power$_{output-total}$: | ≈7,000 watts |

The present invention may be embodied in other specific forms without departing from its spirit of essential characteristics. The described embodiments are to be considered in all respects only al illustrative and not restrictive. The scope of the invention is, therefore, indicated by the appended claims, rather than by the foregoing description. All changes, which come within the meaning and range of equivalency of the claims, are to be embraced within their scope.

What is claimed is:

1. A method of generating quantum energy, said method comprising the steps of:
    (a) supplying a plurality of electrons to a bounded area;
    (b) causing said electrons to fill available energy levels, wherein some of said electrons are required to fill quantum energy levels;
    (c) generating a quantum macro object from said electrons, said quantum macro object having a positively charged nucleus with a boundary, and an electron cloud surrounding said positively charged nucleus, said electron cloud comprising a plurality of free-floating electrons and a plurality of quantum electrons;
    (d) inducing an active impact upon said quantum macro object by energizing said quantum electrons, wherein said quantum electrons are caused to move in an orbital manner about said nucleus, said active impact causing said quantum electrons to radiate quantum energy.

2. A method of generating high-energy photons comprising the steps of:
    (a) isolating a gaseous substance within a bounded area, wherein said gaseous substance and said bounded area contain a plurality of composition particles;
    (b) energizing said gaseous substance, and particularly said particles within said gaseous substance and said bounded area, thus causing said gaseous substance to transition into a glow discharge plasma state, wherein said particles are separated into their component atomic nuclei and electron parts;
    (c) increasing gas pressure within said bounded area to transition said glow discharge plasma to a quantum macro object, wherein said quantum macro object comprises a positively charged nucleus and an electron cloud surrounding said positively charged nucleus, said electron cloud comprising a plurality of quantum electrons and a plurality of free-floating electrons, said quantum electrons comprising large amounts of potential energy; and
    (d) energizing said quantum electrons by inducing an active impact upon said quantum macro object, wherein said quantum electrons are caused to move about and orbit said nucleus of said quantum macro object such that said potential energy existing within said quantum electrons is converted and released as quantum energy.

3. The method of claim 2, wherein said bounded area is typically created by a dielectric selected from a group consisting of a dielectric container and a properly charged gaseous substance.

4. A method of generating quantum energy, said method comprising the steps of:
    (a) filling a dielectric container with a gaseous substance, said dielectric container having an identified volume of space;
    (b) placing said dielectric container within a radiation chamber;
    (c) energizing said gaseous substance to transform said gaseous substance into a plasma or glow discharge plasma state;
    (d) transforming said plasma into a new state to obtain a quantum macro object having a positively charged nucleus with a definite and distinct boundary and an electron cloud adjacent to and surrounding said boundary, said electron cloud containing a plurality of quantum electrons in a quantum state and a plurality of free-floating electrons not associated with said quantum object, said electron cloud contained within a dielectric barrier created between a dielectric wall within said dielectric container and said nucleus of said quantum macro object; and
    (e) inducing an active impact upon said quantum macro object by energizing said quantum electrons with an electrical current, wherein said quantum electrons are caused to accelerate in an orbital motion around said quantum macro object, thereby radiating high-energy photons as quantum energy, said active impact causing the generation of said quantum energy.

5. The method of claim 4, wherein said step of filling a dielectric container with a gaseous substance is continuous and ongoing as needed to sustain said generated quantum macro object.

6. The method of claim 4, wherein said gaseous substance is selected from a group of gasses consisting of air, argon, helium, hydrogen, nitrogen, oxygen, neon, xenon, radon, krypton, and any combinations of these.

7. The method of claim 4, wherein said dielectric container is substantially cylindrical in shape.

8. The method of claim 4, wherein said dielectric container is comprised of a dielectric material composition selected from a group consisting of quartz, ceramic, and porcelain.

9. The method of claim 4, further comprising a step of evacuating said dielectric container, prior to said step of filling said container with a gaseous substance, using vacuum means.

10. The method of claim 9, wherein said step of transforming said plasma into a quantum macro object comprises turning off said vacuum means and increasing gas pressure within said dielectric container, thereby subjecting said plasma within said dielectric container to an increase of pressure.

11. The method of claim 4, wherein said step of energizing said gaseous substance comprises radiating said gaseous substance with high frequency radiation, as generated from a high frequency supply.

12. The method of claim 11, wherein said gaseous substance is radiated by said high frequency supply at a frequency between about 1 MHz and 100 GHz.

13. The method of claim 11, wherein said high frequency radiation is generated at an identified input power level of at least 2000 watts.

14. The method of claim 13, wherein said input power level of said high frequency radiation contributes to the number of electrons in said plasma.

15. The method of claim 4, wherein said step of energizing said gaseous substance comprises energizing said gaseous substance with energy as provided by a power supply selected from a group consisting of an R-F generator, a microwave generator, a laser generator, an electric discharge generator, and an electromagnetic supply.

16. The method of claim 4, wherein said step of energizing said gaseous substance to transform said gaseous substance into a plasma is continuous and ongoing as needed to sustain said generated quantum macro object throughout an entire duration of said method of generating quantum energy.

17. The method of claim 4, wherein said step of energizing said gaseous substance is conducted rapidly so as to cause an atomic nuclei component to absorb as little energy as possible.

18. The method of claim 17, wherein said step of energizing said gaseous substance is initially done within a time range between about $10^{-6}$ to about $10^{-9}$ seconds.

19. The method of claim 4, wherein said energizing said electrons in said step of inducing an active impact comprises generating electric current using a power supply and introducing said electric current within said quantum macro object by means of two or more electrodes coupled to said dielectric container, said electric current induced at an identified input power having an identified voltage and current, wherein said current causes said quantum electrons to become energized and to radiate said quantum energy.

20. The method of claim 19, wherein said electric current is a high voltage electric discharge comprising at least about 2,000 volts.

21. The method of claim 20, wherein said electric discharge comprises a current at least 3 amps.

22. The method of claim 19, wherein said two or more electrodes are comprised of a material selected from a group consisting of tungsten, copper, brass, and other alloys resistant against high temperature and destruction by high-energy particles.

23. The method of claim 4, wherein said energizing said electrons in said step of inducing an active impact comprises subjecting said quantum electrons to an electromagnetic field generated at an identified input power, as generated by an electromagnetic field generator, said electromagnetic field induces a current across said quantum macro object, said electromagnetic field generated at an identified voltage and current, wherein said current causes said electrons to become energized and to radiate quantum energy.

24. The method of claim 23, wherein said electromagnetic field generator is a pulse electromagnetic field generator.

25. The method of claim 4, further comprising a step of pressurizing said gaseous substance within said dielectric container, which allows a greater amount of gaseous substance, and its associated particles, to be contained within said dielectric container, thus ultimately providing a more dense electron filled quantum macro object.

26. The method of claim 4, wherein said quantum macro object is a two-dimensional quantum macro object.

27. The method of claim 4, wherein said quantum energy radiated from said quantum electrons is continuous and ongoing, without loss, as long as conditions are maintained that enabled the creation of said quantum object.

28. The method of claim 4, wherein a portion of said quantum energy is harnessed as input power to accomplish said step of energizing said gaseous substance, said step of inducing an active impact upon said quantum macro object thus becoming self-sustaining by allowing said portion of said quantum energy to provide the necessary input power to maintain and continue the creation of said quantum energy.

29. A method of generating high-energy photons, said method comprising the steps of:
(a) filling a quartz dielectric container with a gaseous substance at an identified initial pressure, said dielectric container having an identified volume of space;
(b) placing said quartz dielectric container within a sealable and insulated pressure chamber;
(c) evacuating said chamber using vacuum means;
(d) radiating, continuously, said chamber with microwave radiation at a minimum frequency of about 2 GHz, such that composition atoms of said gaseous substance disassociate and disintegrate to their component electron and atomic nuclei particles, wherein said radiation energizes said gaseous substance, wherein said gaseous substance ionizes and transitions to a glow discharge plasma state;
(e) increasing the gas pressure within said quartz dielectric container, thus causing said glow discharge plasma to transition to a new state as a quantum macro object, said quantum macro object comprised of an autonomous body having a positively charged structureless component that forms a metastable homogenous compact nuclei having a distinct boundary, and an electron cloud adjacent to and surrounding said nuclei, said electron cloud containing a plurality of quantum electrons in a quantum state and a plurality of free-floating electrons not associated with said quantum macro object, said electron cloud contained within a dielectric barrier created between a dielectric wall within said dielectric container and said nucleus of said quantum macro object, said dielectric wall comprising an electron layer contained therein; and
energizing said quantum macro object by inducing an active impact on said quantum macro object, said active impact created by introducing an electrical current into said electron cloud adjacent said boundary of said quantum macro object, said electrical current comprising a minimum voltage of about 2,000 volts and a minimum current of about 3 amps, said electrical current energizing said quantum electrons and causing them to move in an orbital manner about said quantum macro object and within said dielectric barrier at a constant acceleration $a_c$ and with a kinetic energy $E_k$, such that said energized electrons generate and radiate inexhaustible quantum energy $E_n$ equal to said kinetic energy $E_k$.

30. A system for generating high-energy photons, said system comprising:
 (a) a gaseous substance having a plurality of composition particles therein;
 (b) means for containing said gaseous substance within a bounded area;
 (c) means for energizing said gaseous substance, and particularly said particles therein, to transform said gaseous substance into a glow discharge plasma state, wherein the particles are separated into their component atomic nuclei and electron parts;
 (d) means for increasing gas pressure within the bounded area to transition the glow discharge plasma to a quantum macro object, wherein the quantum macro object comprises a positively charged nucleus and an electron cloud surrounding the positively charged nucleus, the electron cloud comprising a plurality of quantum electrons and a plurality of free-floating electrons, the quantum electrons comprising large amounts of potential energy;
 (e) an energizer for energizing the quantum electrons by inducing an active impact upon the quantum macro object, wherein the quantum electrons are caused to orbit the nucleus of the quantum macro object such that the potential quantum energy existing within the quantum electrons is continuously and inexhaustibly converted and released in the form of quantum energy.

31. The system of claim 30, wherein said means for containing said gaseous substance is selected from a group consisting of an open dielectric container, a closed dielectric container, and a dielectric formed by charged air.

32. The system of claim 30, wherein said means for energizing said gaseous substance is selected from a group consisting of a microwave supply, an R-F supply, a high-voltage discharge supply, and a high-energy particle beam supply.

33. The system of claim 30, wherein said energizer is a high voltage current generator assembly.

34. The system of claim 30, wherein said energizer is an electromagnetic supply assembly.

* * * * *